(12) United States Patent
Al Sayeed et al.

(10) Patent No.: US 11,456,814 B2
(45) Date of Patent: Sep. 27, 2022

(54) AUTOMATIC OPTICAL LINK CALIBRATION WITH CHANNEL HOLDERS

(71) Applicant: Ciena Corporation, Hanover, MD (US)

(72) Inventors: Choudhury A. Al Sayeed, Stittsville (CA); David C. Bownass, Ottawa (CA); David Atkinson, Ottawa (CA); Scott Kohlert, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/315,879

(22) Filed: May 10, 2021

(65) Prior Publication Data

US 2021/0281346 A1   Sep. 9, 2021

Related U.S. Application Data

(63) Continuation-in-part of application No. PCT/US2019/060392, filed on Nov. 8, 2019, which is a continuation of application No. 16/189,283, filed on Nov. 13, 2018, now Pat. No. 10,547,404.

(51) Int. Cl.
*H04J 14/02* (2006.01)
*H04B 10/071* (2013.01)
*H04B 10/079* (2013.01)
*H04B 10/27* (2013.01)

(52) U.S. Cl.
CPC ........ *H04J 14/0202* (2013.01); *H04B 10/071* (2013.01); *H04B 10/07953* (2013.01); *H04B 10/07955* (2013.01); *H04B 10/27* (2013.01); *H04J 14/0221* (2013.01)

(58) Field of Classification Search
None
See application file for complete search history.

(56) References Cited

U.S. PATENT DOCUMENTS

| 6,031,647 | A | 2/2000 | Roberts |
| 6,304,347 | B1 | 10/2001 | Beine et al. |
| 6,515,777 | B1 * | 2/2003 | Arnold ............... H04J 14/0221 359/337 |
| 6,798,567 | B2 * | 9/2004 | Feldman ............. H04B 10/296 359/341.42 |
| 6,959,149 | B2 | 10/2005 | Bragg et al. |
| | | (Continued) | |

FOREIGN PATENT DOCUMENTS

EP     2 993 806 A1    9/2016

OTHER PUBLICATIONS

Feb. 27, 2020 International Search Report and Written Opinion for International Patent Application No. PCT/US2019/060392.

*Primary Examiner* — Darren E Wolf
(74) *Attorney, Agent, or Firm* — Clements Bernard Baratta; Lawrence A. Baratta, Jr.; Christopher L. Bernard

(57) ABSTRACT

Automatic optical link calibration systems and methods include an optical node with an Optical Add-Drop Multiplexer (OADM) multiplexer including a channel holder source; an optical amplifier connected to the OADM multiplexer and to a fiber span; an Optical Channel Monitor (OCM) configured to monitor optical spectrum before and after the optical amplifier; and a controller configured to obtain data associated with the fiber span including measurements from the OCM, determine settings of the channel holder source needed to meet a target launch power profile for the fiber span, and configure the channel holder source based on the determined settings.

19 Claims, 27 Drawing Sheets

(56) References Cited

U.S. PATENT DOCUMENTS

| | | | |
|---|---|---|---|
| 7,483,205 B1 | 1/2009 | Lundquist et al. | |
| 8,064,770 B2 | 11/2011 | Manna | |
| 8,509,621 B2 | 8/2013 | Boertjes et al. | |
| 8,909,038 B2 | 12/2014 | Cannon et al. | |
| 8,971,705 B2 | 3/2015 | Boertjes et al. | |
| 9,197,322 B2 | 11/2015 | Boertjes et al. | |
| 9,252,913 B2 | 2/2016 | Al Sayeed et al. | |
| 9,276,696 B2 | 3/2016 | Al Sayeed et al. | |
| 9,344,191 B2 | 5/2016 | Al Sayeed et al. | |
| 9,419,708 B2 | 8/2016 | Rad et al. | |
| 9,768,902 B2 | 9/2017 | Al Sayeed et al. | |
| 9,906,294 B2 | 2/2018 | Al Sayeed et al. | |
| 9,985,726 B1 | 5/2018 | Al Sayeed et al. | |
| 10,142,022 B1 | 11/2018 | Harley et al. | |
| 10,361,957 B1 | 7/2019 | MacKay et al. | |
| 10,439,709 B1 | 10/2019 | Al Sayeed | |
| 2002/0109906 A1* | 8/2002 | Grubb | H04B 10/2935 359/334 |
| 2003/0185563 A1* | 10/2003 | Stephens | H04B 10/296 359/25 |
| 2005/0024715 A1 | 2/2005 | Inoue et al. | |
| 2005/0152693 A1 | 7/2005 | Grand et al. | |
| 2008/0304829 A1 | 12/2008 | Sato | |
| 2010/0158532 A1* | 6/2010 | Goto | H04B 10/07955 398/83 |
| 2013/0058647 A1 | 3/2013 | Boertjes et al. | |
| 2014/0160919 A1* | 6/2014 | Kar | H04W 24/04 370/220 |
| 2015/0085350 A1 | 3/2015 | Griseri et al. | |
| 2015/0117858 A1 | 4/2015 | Al Sayeed et al. | |
| 2015/0132009 A1 | 5/2015 | Yuki et al. | |
| 2018/0069648 A1 | 9/2018 | Inada | |
| 2018/0262292 A1 | 9/2018 | Dangui et al. | |
| 2018/0343078 A1 | 11/2018 | Roberts et al. | |
| 2019/0007156 A1 | 1/2019 | Rad et al. | |
| 2019/0103939 A1 | 4/2019 | Al Sayeed et al. | |
| 2019/0253361 A1 | 8/2019 | Mackay et al. | |

\* cited by examiner

AUTOMATIC OPTICAL LINK CALIBRATION WITH CHANNEL HOLDERS

CROSS-REFERENCE TO RELATED APPLICATIONS

The present disclosure is a bypass continuation-in-part application of PCT/US2019/060392, filed Nov. 8, 2019, and which claimed priority to U.S. patent application Ser. No. 16/189,283, filed on Nov. 13, 2018, and which is now U.S. Pat. No. 10,547,404, issued on Jan. 28, 2020, the contents of each are incorporated by reference in their entirety.

FIELD OF THE DISCLOSURE

The present disclosure generally relates to fiber optic transmission. More particularly, the present disclosure relates to systems and methods for automatic optical link calibration with Amplified Stimulated Emission (ASE) channel holders.

BACKGROUND OF THE DISCLOSURE

In fiber optics, optical links (optical fibers) require calibration to maximize the Optical Signal-to-Noise Ratio (SNR) on the link. Link calibration generally includes determining launch power of transmitters, determining optical amplifier (e.g., Erbium Doped Fiber Amplifier (EDFA)) gain settings, and determining actuator (e.g., Variable Optical Attenuators (VOAs), Wavelength Selective Switch (WSS) pixel settings, etc.) settings. The optimal launch powers are determined to maximize OSNR and minimize non-linear penalties for different fiber types. The optical amplifier gain settings can include determining and setting EDFA gain stages, also known as gain switch modes (selecting two-stage versus three-stage gain blocks per EDFA) to minimize Noise Figure (NF) based on the required gain to compensate for span loss. The actuator settings are determined in every span to meet the launch power target with minimal noise impact that includes setting for Raman gain, EDFA gains, Post-VOA attenuations, mid-stage equalization (if any) to minimize amplifier ripple and Stimulated Raman Scattering (SRS) impacts per span, etc. Specifically, link calibration includes determining the aforementioned settings for initially turning up an optical link. Once turned up, various photonic control loops can be used to determine the settings over time and based on feedback.

The conventional approach for link calibration includes modeling a system with the physical characteristics determined via a simulation or planning tool (e.g., offline). This considers the worst case insertion losses or in some cases using statistically distributed values based on a certain batch of manufactured data points. This further considers End of Life (EOL) conditions with full-fill spectrum, EOL repair margins, and component aging penalties. This further considers user inputs on per span fiber properties such as fiber type, fiber length, average fiber loss (in dB per km), an effective core area in fiber, etc.

Usually, simulations provide the expected parameter setting required for initial system turn up (i.e., link calibration) that includes defining target launch power and amplifier gain tilt for handling Wavelength Dependent Loss (EDL), setting gain switch modes on EDFAs, and setting recommended gain for Raman amplifiers. However, simulations typically are wrong in two places, namely wrong entries input into the simulation and wrong provisioning on the system. Wrong entries in the simulation can occur due to incorrect data, poor estimates, input error, etc. This can include system parameters for fiber type, length, average loss per distance, estimated patch panel losses, the location of splices in the fiber span where different fiber types are spliced together, etc. Of course, wrong entries generate errors in the calibration settings as well as on the expected system performance. Also, the wrong provisioning on the system can occur when simulation outcomes are manually set by the user in the network elements. By automating the provisioning steps from simulations to the network elements directly, this error step is eliminated. However, it is not possible to remove the errors due to the wrong entries as this data is not exactly known a priori (otherwise it would not be a simulation).

After the initial link calibration, closes loop controllers are run using measured system parameters to optimize performance, although the overall outcome remains dominated by the user provisioned initial targets as outlined above. That is if the initial settings are wrong or not aligned with the actual system measured parameters, the system will not be able to generate the best possible optical outcome. A good example is target launch power settings for Raman gain settings. System controllers will only operate to maximize performance to match the provisioned target. If that target is wrong, the overall performance outcome remains underachieved.

The goal is to support system calibration at start-up without having to rely on simulations. Further, setting up system parameters for C+L links will be further complicated, compared to only C-band or only L-band transmission, where each C+L links will have dedicated components to support C- and L-band transmission in the same fiber and will require explicit parameter settings for both bands for optimal operation.

BRIEF SUMMARY OF THE DISCLOSURE

In an embodiment, an automatic optical link calibration method includes, in an optical section with an Optical Add-Drop Multiplexer (OADM) multiplexer, an OADM demultiplexer, and zero or more in-line optical amplifiers between the OADM multiplexer and the OADM demultiplexer, wherein the optical section includes integrated measurement equipment, and wherein the OADM multiplexer and the OADM demultiplexer have a route and select architecture, obtaining measurement data from the integrated measurement equipment subsequent to turn up; determining an optimal target launch power profile per fiber span in the optical section based on the measurement data; configuring channel holders at the OADM multiplexer to meet the optimal target launch power profile per fiber span; and calibrating each fiber span to determine settings of equipment at the OADM multiplexer, the OADM demultiplexer, and the zero or more in-line optical amplifiers. The automatic optical link calibration method can further include automatically configuring the equipment with the determined settings.

The calibrating can be performed on a node-by-node basis from the OADM multiplexer to the zero or more in-line optical amplifiers to the zero or more in-line optical amplifiers. The node-by-node basis can be performed without dependencies or end-to-end control between nodes. The integrated measurement equipment can include an Optical Time Domain Reflectometer (OTDR) used to determine whether or not to initiate Raman amplifiers and span loss. Switchable line amplifier modules can be utilized at each of the OADM multiplexer, the OADM demultiplexer, and the zero or more in-line optical amplifiers, wherein the switchable line amplifier modules include operation in a High Gain or Low Gain mode based on a selection of switches, and wherein the calibrating sets the mode of each switchable line amplifier module. The channel holders can be utilized to emulate channel loading condition so that Stimulated Raman Scattering (SRS), tilt, and ripple are measured to reflect full-fill spectral loading condition.

At least one of the OADM multiplexer, the OADM demultiplexer, and the zero or more in-line optical amplifiers can have a switchable line amplifier module with mid-stage equalization for a Dynamic Gain Flattening Filtering (DGFF), and wherein the calibrating sets the mid-stage equalization, target gain and gain-tilt actuators to compensate for SRS, tilt, and ripple coming from upstream spans. The zero or more in-line optical amplifiers can include at least one amplifier with no input or output Optical Channel Monitors (OCMs) and with no mid-stage equalization capability, and wherein the calibrating sets only gain target and gain-tilt actuators. The zero or more in-line optical amplifiers can include at least one Raman amplifier and one switchable line amplifier, the Raman gain is set to maximum achievable for a given fiber type and loss considering non-linear limits, and then the high gain or low gain mode is set for the switchable line amplifier to get optimal composite noise figure for the span.

In another embodiment, an optical section includes an Optical Add-Drop Multiplexer (OADM) multiplexer; an OADM demultiplexer; and zero or more in-line optical amplifiers between the OADM multiplexer and the OADM demultiplexer, wherein the OADM multiplexer, the zero or more in-line optical amplifiers, and the OADM demultiplexer include integrated measurement equipment, wherein the OADM multiplexer and the OADM demultiplexer have a route and select architecture, and wherein measurement data is obtained from the integrated measurement equipment subsequent to turn up, an optimal target launch power profile per fiber span is determined in the optical section based on the measurement data, channel holders at the OADM multiplexer are configured to meet the optimal target launch power profile per fiber span, and each fiber span is automatically calibrated to determine settings of equipment at the OADM multiplexer, the OADM demultiplexer, and the zero or more in-line optical amplifiers. The equipment can be automatically configured with the determined settings.

Automatic calibration can be performed on a node-by-node basis from the OADM multiplexer to the zero or more in-line optical amplifiers to the zero or more in-line optical amplifiers. The integrated measurement equipment can include an Optical Time Domain Reflectometer (OTDR) used to determine whether or not to initiate Raman amplifiers and span loss. Switchable line amplifier modules can be utilized at each of the OADM multiplexer, the OADM demultiplexer, and the zero or more in-line optical amplifiers, wherein the switchable line amplifier modules include operation in a High Gain or Low Gain mode based on a selection of switches, and wherein automatic calibration sets the mode of each switchable line amplifier module. At least one of the OADM multiplexer, the OADM demultiplexer, and the zero or more in-line optical amplifiers can have a switchable line amplifier module with mid-stage equalization for a Dynamic Gain Flattening Filtering (DGFF), and wherein the automatic calibration sets the mid-stage equalization, target gain and gain-tilt actuators to compensate for SRS, tilt, and ripple coming from upstream spans. The channel holders can be utilized to emulate actual channel loading condition so that Stimulate Raman Scattering (SRS), tilt, and ripple are measured to reflect full-fill spectral loading condition.

In a further embodiment, a controller is associated with an optical node in an optical section with an Optical Add-Drop Multiplexer (OADM) multiplexer, an OADM demultiplexer, and zero or more in-line optical amplifiers between the OADM multiplexer and the OADM demultiplexer, wherein the optical section includes integrated measurement equipment, and wherein the OADM multiplexer and the OADM demultiplexer have a route and select architecture. The controller includes a processor and memory storing instructions that, when executed, cause the controller to obtain measurement data from the integrated measurement equipment subsequent to turn up; determine an optimal target launch power profile per fiber span in the optical section based on the measurement data; configure channel holders at the OADM multiplexer to meet the optimal target launch power profile per fiber span; and cause calibration of a fiber span to determine settings of equipment at one or more of the OADM multiplexer, the OADM demultiplexer, and the zero or more in-line optical amplifiers. The memory storing instructions that, when executed, can further cause the controller to automatically configure the equipment with the determined settings. Switchable line amplifier modules can be utilized at each of the OADM multiplexer, the OADM demultiplexer, and the zero or more in-line optical amplifiers, wherein the switchable line amplifier modules include operation in a High Gain or Low Gain mode based on a selection of switches, and wherein automatic calibration sets the mode of each switchable line amplifier module.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for automatic optical link calibration with Amplified Stimulated Emission (ASE) channel holders. The systems and methods calibrate an optical link automatically at initial installation time to maximize SNR based on the real-time deployed configuration. More precisely, the systems and methods find optimal photonic parameters such as optimal launch power profile to fiber, amplifier gain-blocks (also known gain switch modes), and all gain/loss actuator settings over an Optical Add/Drop Multiplexer (OADM) to OADM optical section using ASE-based channel holders. The objective is to set all parameters based on the actually deployed configuration instead of waiting for the parameters to be set manually or by an offline planning tool. Thus, the systems and methods automatically turn up an optical link with system measured parameters, considering actually deployed fiber plants and its characteristics, lumped losses or patch panel losses before it hits actual fiber spans, and the card calibration components (such as Insertion Loss (IL), mid-stage loss) that plays a significant role on calibrating optical links and cannot be fully handled with offline planning tools.

Example Optical Multiplex Section (OMS)

Figure 1:
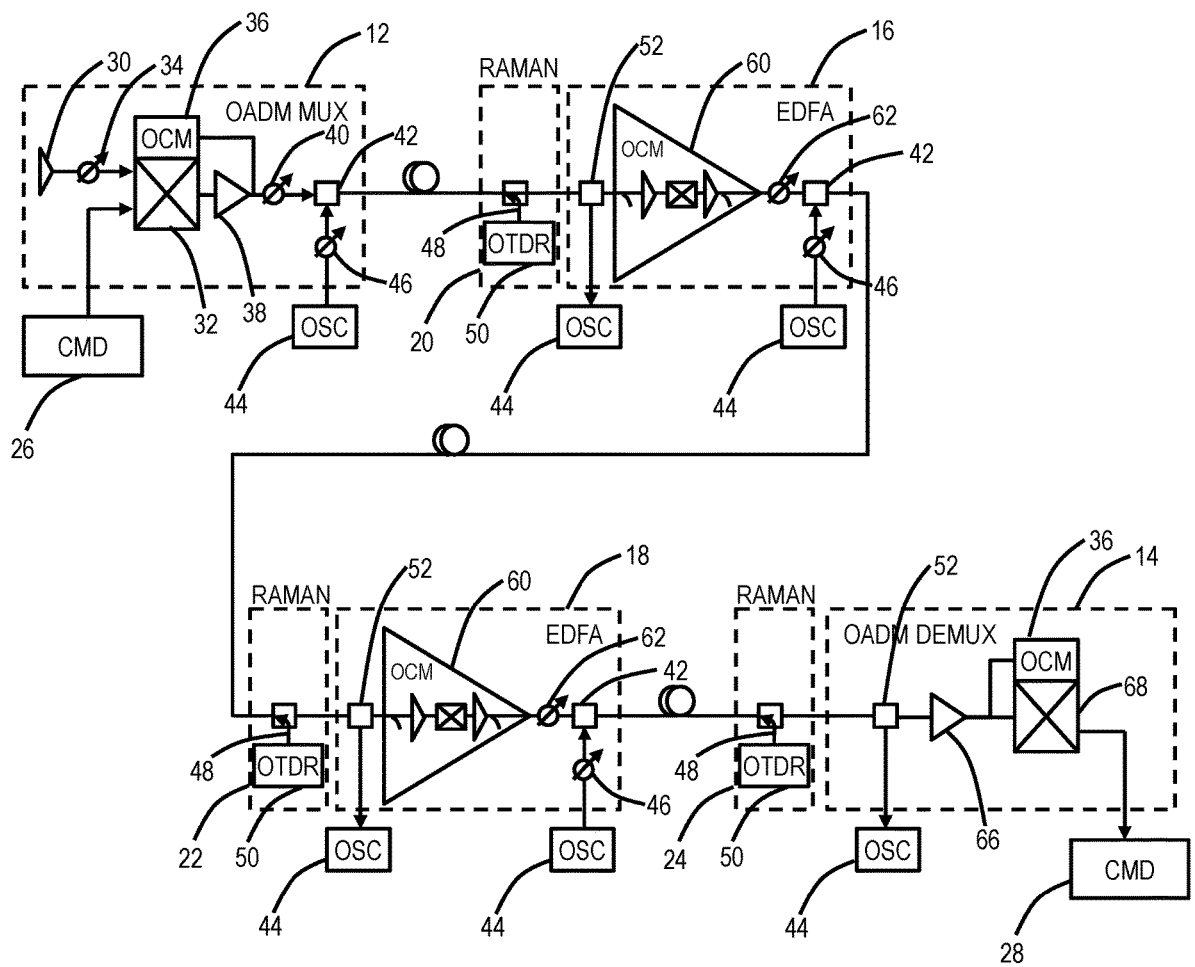
FIG. 1 is a network diagram of an Optical Multiplex Section (OMS) for describing the link calibration.

FIG. 1 is a network diagram of an Optical Multiplex Section (OMS) 10 for describing the link calibration. The OMS 10 is between OADMs and, for illustration purposes, FIG. 1 illustrates a unidirectional OMS 10 from an OADM multiplexer 12 to an OADM demultiplexer 14. Also, in this example, there are two intermediate line amplifiers 16, 18 as well as Raman amplifiers 20, 22, 24. Those of ordinary skill in the art will recognize other embodiments are contemplated, and the OMS 10 is merely presented for illustration purposes. A Channel Multiplexer/Demultiplexer (CMD) 26 at the OADM multiplexer 12 connects to transceivers, transponders, modems, etc. for channel add. A corresponding CMD 28 at the OADM demultiplexer 14 connects to corresponding transceivers, transponders, modems, etc. for channel drop. The OMS 10 has the optical property of having the same channels between the OADM multiplexer 12 and the OADM demultiplexer 14 as these are the only points of optical add/drop. Stated differently, the OMS 10 has a constant total spectrum loading throughout.

The OADM multiplexer 12 includes a channel holder source 30 which connects to a Wavelength Selective Switch (WSS) 32. The channel holder source 30 generates channel holders as described herein, such as ASE-based channel holders. A VOA 34 can be located between the channel holder source 30 and the WSS 32 for power attenuation of the channel holders. The CMD 26 is also connected to the WSS 32. The WSS 32 is configured to selectively switch channels from the CMD 26 to an output degree (in this example, towards the OADM demultiplexer 14) and to selectively carve an output of the channel holder source 30 to provide channel holders where required, such as where there is no present channel from the CMD 26 or from another degree. Note, while the WSS 32 is illustrated as a WSS, it could be any wavelength selection device.

The OADM multiplexer 12 also includes an Optical Channel Monitor (OCM) 36 which can monitor the optical spectrum, such as before and after an optical amplifier 38. The optical amplifier 38 is a post-amplifier and can be an EDFA. A VOA 40 can be located after the optical amplifier 38. A coupler 42 allows insertion of an Optical Supervisory Channel (OSC) 44 (also known as an Optical Service Channel), and there can be a VOA 46 after the OSC 44.

The OMS 10 includes counter-propagating Raman amplifiers 20, 22, 24 which can include Raman pumps 48 and an Optical Time Domain Reflectometer (OTDR) 50. The OTDR 50 is configured to monitor fiber health by inserting a probe signal and monitoring the associated backscatter signal to detect fiber loss and events on the fiber (splices, etc.). The optical amplifiers 16, 18 include a coupler 52 to extract the OSC 44, a multi-stage amplifier 60, a VOA 62, and a coupler 42 to insert the OSC 44. The multi-stage amplifier 60 can include two or three-stages, and additional details are described herein.

The OADM demultiplexer 14 includes the coupler 52 to extract the OSC 44, an optical amplifier 66 which is a pre-amplifier and can be an EDFA. The optical amplifier 66 connects to a WSS 68 which demultiplexes channels for a local drop to the CMD 28 or for routing to another degree (not shown). The WSS 68 (and the WSS 32) can be a route and select-based device so that calibration effects on the OMS 10 do not propagate to an adjacent OMS (not shown).

With reference to the OMS 10, the following components require link calibration:

The optical amplifiers 38, 66 and the Raman amplifiers 20, 22, 24 required gain target settings;

Target launch power is required out of the OADM multiplexer 12 and the intermediate line amplifiers 16, 18;

VOA settings are required for the various VOAs;

The multi-stage amplifiers 60 require stage configuration; and

The WSS 32 is required to configure the outputs of the channel holder source 30, as needed.

Automatic Link Calibration Process

Figure 2:
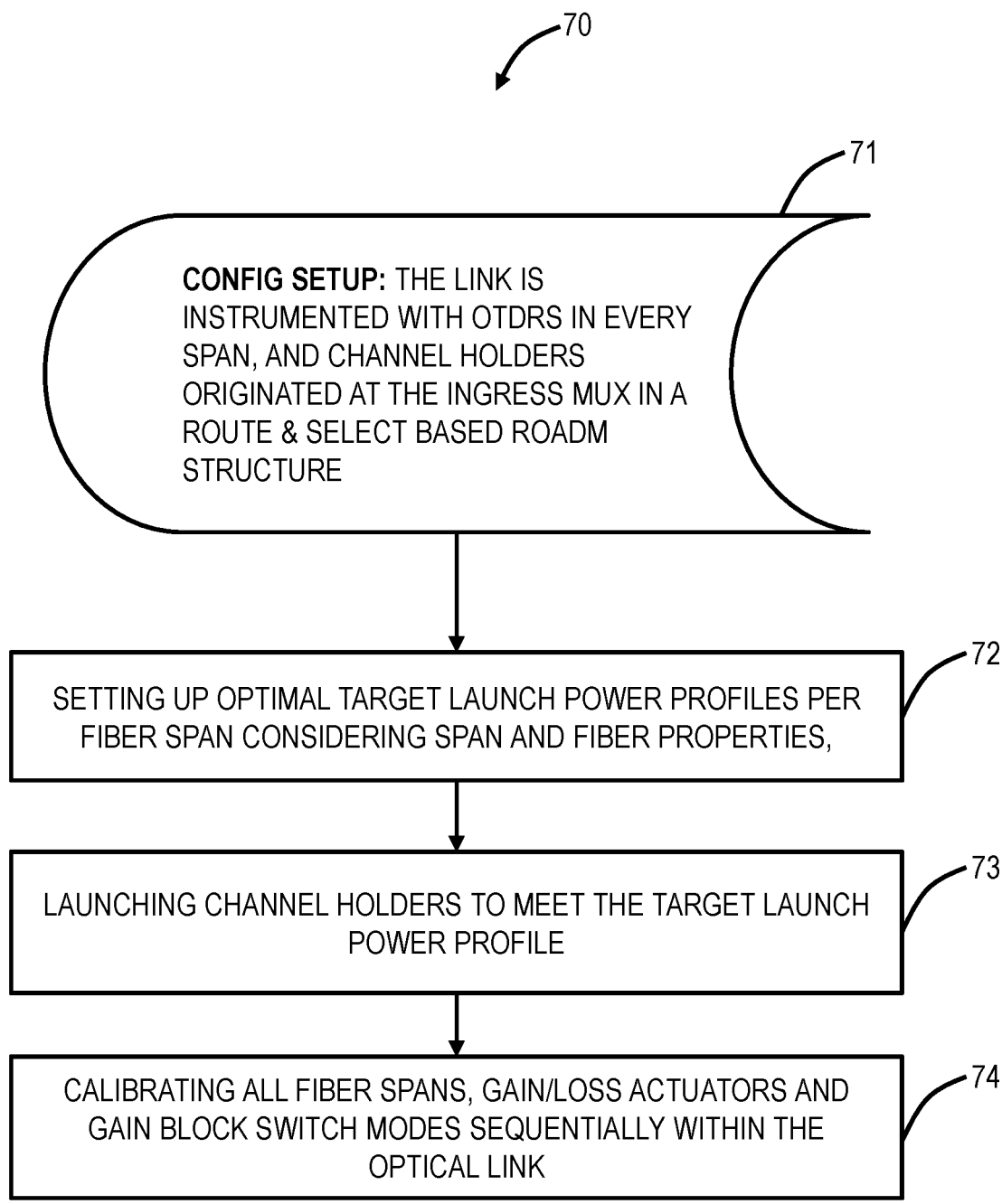
FIG. 2 is a flowchart of an automatic link calibration process.

FIG. 2 is a flowchart of an automatic link calibration process 70. The automatic link calibration process 70 can be implemented in the OMS 10. The automatic link calibration process 70 requires measurement equipment in associated optical network elements and devices, such as an OTDR in every span, channel holders at the ingress OADM, and a Route and Select OADM structure (step 71). The measurement equipment such as the OTDR is utilized to gather measurements of actual conditions, e.g., span loss, fiber type, etc. In this manner, the automatic link calibration process 70 does not require assumptions for a simulation, but rather actual data. The channel holders are utilized to provide power assuming the automatic link calibration process 70 is performed at initial turn up, with few channels equipped. The channel holders allow calibration of the link considering full-fill channel conditions to handle the impact of SRS, gain ripple, Spectral Hole Burning (SHB), and tilts. Finally, the Route and Select OADM structure ensures any calibration to the OMS 10 does not affect any adjacent sections. The Route and Select ROADM architecture contains WSSs at both the multiplexer and demultiplexer directions that keeps the demultiplexer WSS channel attenuations closed during calibration process in order to keep the calibration effects to be contained within the link.

Again, the automatic link calibration process 70 is over a link, an optical section, i.e., the OMS 10, where the total spectral loading remains the same within the link. The automatic link calibration process 70 includes setting up an optimal target launch power profiles per fiber span considering span and fiber properties (based on the measurements) (step 72), launching channel holders to meet the target launch power profile (step 73), and calibrating all fiber spans, gain/loss actuators and gain block switch modes sequentially within the optical link (step 74).

The automatic link calibration process 70 can use the channel holders as channelized controllable ASE signals at the head end to mimic traffic sources at a full-fill spectral loading condition with optimum launch power targets. This, in turn, is used to calibrate SRS, ripple at each fiber span and to set EDFA gain blocks at each fiber span.

The EDFA gain blocks are set to either low gain or high gain for each EDFA block on the link. The optimum launch power targets are set knowing the patch panel loss before the fiber span, fiber propagation attenuation (in dB/km), fiber length, and type and adjusting launch power targets accordingly to compensate for SRS, based on the measurement data. Advantageously, this data is not estimated and entered into a simulation, but measured. Compensating SRS, ripple in each span includes, measuring the channel spectrum at the input and output of the EDFA, finding a target gain profile for each EDFA, and deriving a target gain, gain tilt, and mid-stage per spectral slice attenuation to compensate SRS, and ripple coming from upstream fiber span.

The channel holders 10 can be carved ASE-based (e.g., a single ASE source that is carved by the WSS 32), modulated, unmodulated, etc. The channel holders 10 are generated at the OADM multiplexer 12 which has the Route and Select architecture. The OTDR in each span can scan both transmit and receive direction. The Raman amplifiers 20, 22, 24 are used in spans, such as if the spans have losses greater than 16 dB. The EDFA with switchable gain blocks allows operation at the low gain range or at the high gain range without compromising the noise performance. Furthermore, EDFAs can be equipped with mid-stage equalizers instead of typical mid-stage VOAs, that can assist on equalizing power spectrum in every span.

Step 71 includes initial configuration steps before starting the calibration. These initial configuration steps, as soon as the span fibers are connected, can include establishing communication between two neighboring nodes via the OSC 44 or via other mechanisms of in-band communications;

using the OTDR 20 to scan each fiber (both transmitting and receiving direction) for point losses, total fiber length, latency, and for measuring back reflections. The OTDR 20 tells if the reflection and point losses are high enough not to initiate high power Raman pumps 48 into the fiber;

confirming the fiber span losses in each direction using the OTDR trace;

performing a Raman gain calibration to find the possible gain range for the associated fiber; and launching telemetry signal into the fiber to discover the fiber properties (such as effective core area, SRS gain coefficient, etc.). This is done by measuring SRS on the telemetry signal with and without the presence of full-fill spectrum power, and then comparing to a lookup table to see how much that varies from the known values of Non-Dispersion Shifted Fiber (NDSF) fiber types. If the fiber properties cannot be discovered due to lack of instrumentation, then fiber type can be manually provisioned in which case properties are read from a lookup table.

The step 72 includes setting an optimal target launch power profile per fiber span in Power Spectral Density (PSD) format based on fiber type and measured span loss. The step 73 includes launching the carved or filtered channel holders to meet the target launch spectral profile. Channel holders are blocked at the end of the link by the OADM demultiplexer 14 WSS 68 and not passed to downstream links. This is to calibrate the link at the full-fill spectral condition, considering SRS, ripple, gain tilt, and SHB impacts.

For step 74, the gain block switch modes can be selected between two-stage and three-stage gain blocks for switchable line EDFAs considering fiber repair margins. The switching gain blocks in the EDFA is a traffic impacting operation, and hence, an optimal setting is required at the initial turn-up stage that can serve optimal NF both at the start of life as well as at the end of life (EOL) condition. Also, for step 74, setting up all other gain/loss actuators in the link that includes, target gain, gain tilt for the EDFAs, and post-VOA attenuation settings for each span.

If the OMS 10 is equipped with the Raman amplifiers 20, 22, 24, then the calibration further includes setting the optimal gain considering span loss and the impact of double Rayleigh scattering. If the OMS 10 is equipped with EDFAs with mid-stage dynamic equalizers, then the calibration further includes, performing a power calibration on the module to meet the target launch spectral profile to the downstream fiber span. This takes out the impact of SRS, ripple, tilt, SHB, WDL impacts coming from the upstream span. If the OMS 10 is equipped with EDFAs with mid-stage VOAs, then the calibration further includes, setting up a gain tilt on the module to accommodate SRS of the downstream fiber span.

The automatic link calibration process 70 can include transmitting a message/token via OSC/in-band comms from one node to the next to indicate a completion of calibration at the nodal level so that the next node can start its own calibration. This enables calibrating the whole link without any end-to-end coordination over the link from a centralized location. The automatic link calibration process 70 is described herein for the C-band but is equally applicable for L-band, as well as for C+L band transmission system. The automatic link calibration process 70 is designed to run in-skin on a network element without any dependency on end-to-end link level control or on upper layer Software Defined Networking (SDN) controller, although the proposed logic can be implemented on a centralized controller and values can be directly pushed down to the photonic components as well.

Advantageously, the automatic link calibration process 70 automates the link setup in real-time based on measured system conditions as the link is installed. That is, optimal settings are auto-derived for the whole link in the same way as an offline simulation tool would have done, but with more accurately measured readings for better performance.

The benefits of the automatic link calibration process 70 include:

maximizing system performance initially (day 1) by setting up target launch power profiles (within a non-linear limit), EDFA gain blocks, and actuators (gain/loss blocks) considering discovered and measured elements;

providing a reference baseline for system settings with the understanding that if the network is modeled in an offline tool, the attributes set on the network will match the offline modeled values;

ease of provisioning: No user intervention at system setup. As soon as the nodes are connected and powered up, the link is auto-calibrated to its optimal targets and ready for carrying traffic with best possible OSNR; and removal of human errors at system startup. Again, the majority causes of system failure and field debugging are due to human error in the initial system modeling with wrong assumptions or from mistakes at system provisioning. The automatic link calibration process 70 alleviates both. Evolving technology and system configurations always force users to become familiar with new setups before manual provisioning, and this also leads to errors. By auto-calibration, the configuration specific setups are benign to users.

Figure 3:
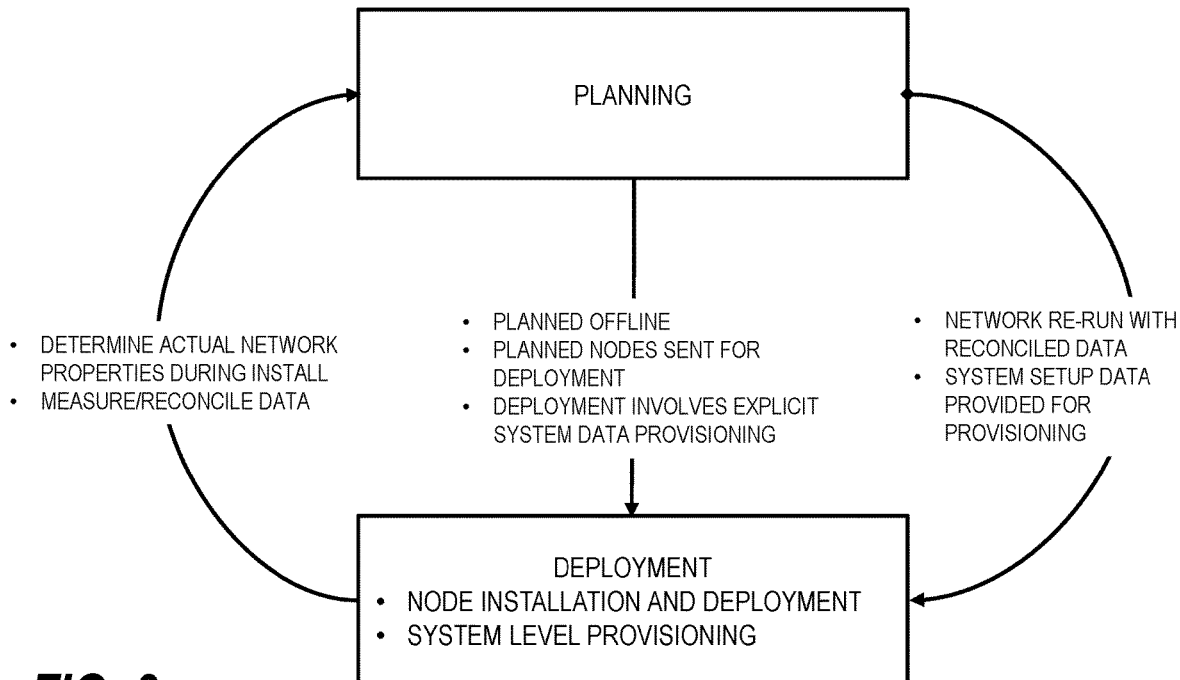
FIG. 3 is a flow diagram of the conventional calibration process.

FIG. 3 is a flow diagram of the conventional calibration process. The conventional calibration process has a planning stage and a deployment stage. There is a back and forth between planning and deployment to determine actual network properties and to measure data. Planning is performed offline, and determined data from the planning is used to provision the system explicitly. There can be reconciliation between simulation data and measured data.

Figure 4:
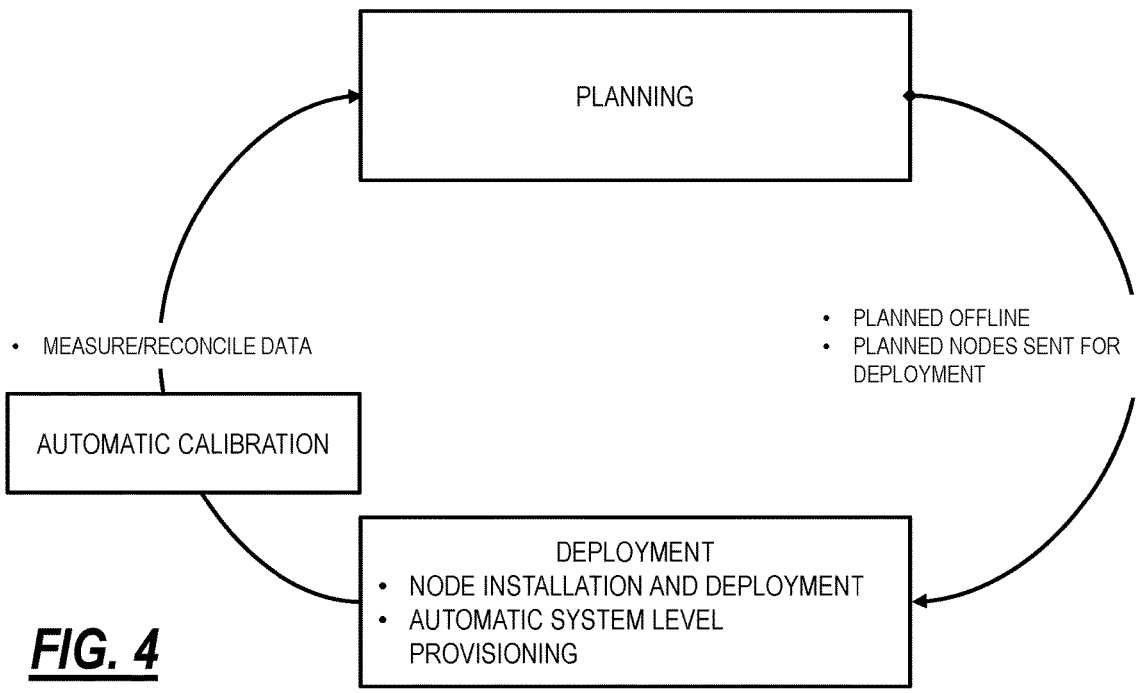
FIG. 4 is a flow diagram of a calibration process with the automatic link calibration process of FIG. 2.

FIG. 4 is a flow diagram of a calibration process with the automatic link calibration process 70. With the automatic link calibration process 70, the need for back and forth data processing between field deployment and offline planning is removed easing off the deployment process. This process is also advantageous for multi-vendor deployments, where if each link equipped with a particular vendor's equipment can calibrate itself to an SNR optimal target, then that eliminates the need for modeling and coordination between multi-vendor equipment.

The automatic link calibration process 70 is in line with offline planning tools, focusing on getting peak launch power per channel per span considering forecast tolerant conditions (EOL, Full-fill). Here, PSD targets (not a single target, instead a PSD launch profile over spectrum considers WDL, SRS) are determined as a function of fiber type, span loss, fiber length, the presence of Raman, etc.

Span Loss

Figure 5:
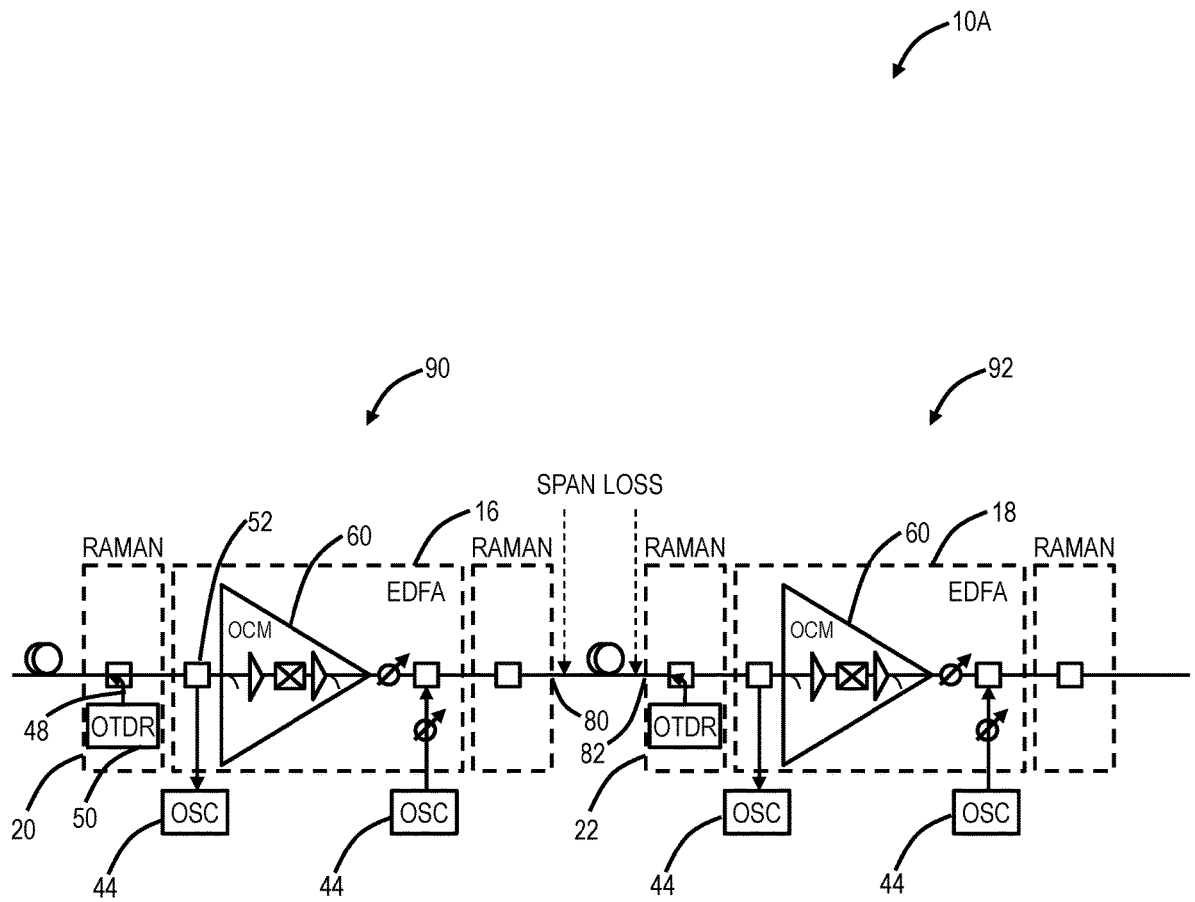
FIG. 5 is a network diagram of a portion of the OMS illustrating a span loss measurement.

FIG. 5 is a network diagram of a portion 10A of the OMS 10 illustrating a span loss measurement. Span loss is defined as the loss between a line out port 80 and a line in port 82 of two adjacent nodes 90, 92. Fiber loss is defined as span loss minus any Path Panel Loss (PPL which can be about 0.5 dB). PPL is the loss from the ports 80, 82 to the beginning of the fiber plant, i.e., patch panels, cabling inside the data center, etc. The nodes 90, 92 can be configured to calculate and report the span loss, such as to an application implementing the automatic link calibration process 70. Generally, the span loss can be determined by the nodes 90, 92 as the Line Out Total Power ((dBm)–Line In Total Power (dBm) (when the measured power is at least >X dBm, where, for example, X=–32 dBm. Alternatively, the span loss can be determined by measuring the loss of the telemetry signal, if the span is Raman amplified, and using a scaling factor to scale to 1550 nm. Further, the span loss can be determined by measuring the loss of the OSC and using a scaling factor to scale to 1550 nm.

Of note, span loss and detecting other properties are described in commonly-assigned U.S. patent application Ser. No. 15/986,396, filed May 22, 2018, and entitled "Optical fiber characterization measurement systems and methods," the contents of which are incorporated herein by reference.

Details of the Automatic Link Calibration Process

Figure 6:
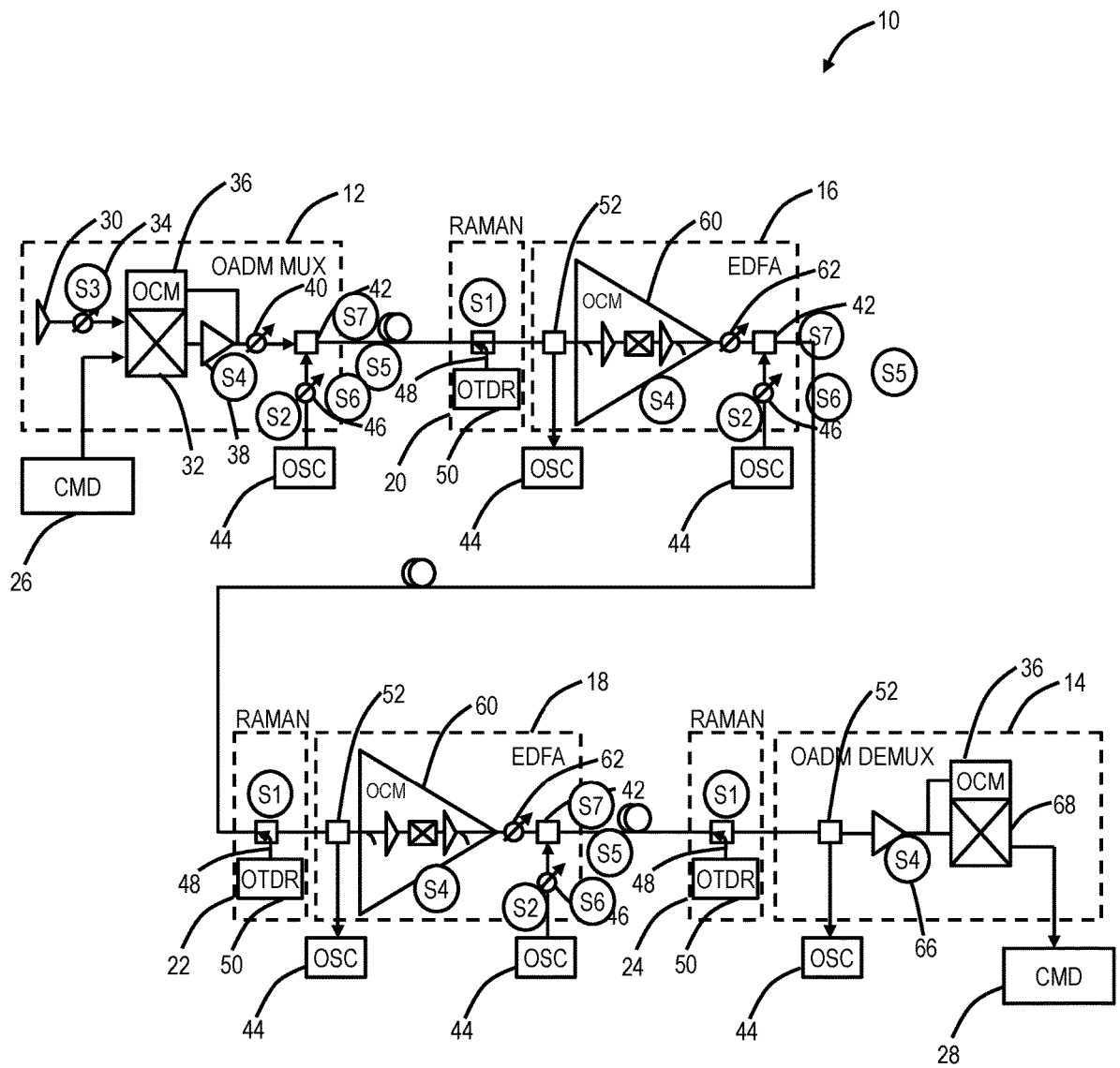
FIGS. 6 and 7 are a network diagram of the OMS illustrating steps of the automatic link calibration process.
Figure 7:
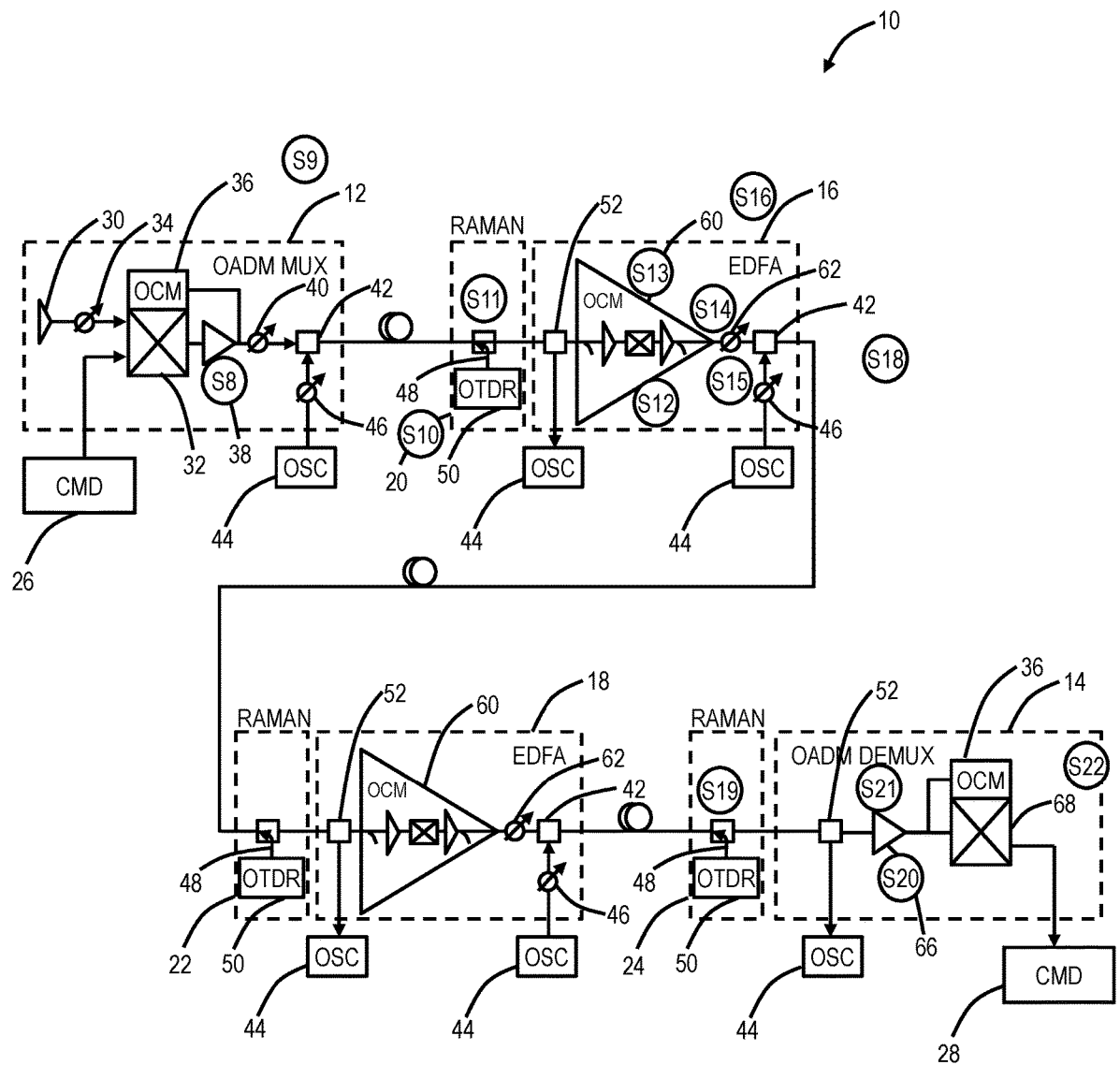

FIGS. 6 and 7 are a network diagram of the OMS 10 illustrating steps S1-S22 of the automatic link calibration process 70. The following description provides operations at the OADM multiplexer 12, the Raman amplifiers 20, 22, 24, the optical amplifiers 16, 18, and the OADM demultiplexer 14. These devices can be cards, modules, chassis, etc. At installation, these devices are powered and connected. As soon as an optical link is up, the OTDR 20 can run a trace such that the Raman pump 48 can be turned on or off (step S1). Here, the Raman pump 48 is initially off and turned on based on the OTDR 20 trace which determines if the link supports Raman (i.e., has enough loss, no major reflections at or near the Raman pump 48, etc.).

The OSC 44 attenuation via the VOA 46 is set to achieve a target OSC launch power into the fiber (step S2). The VOA 34 is set for the channel holder 30 at a minimum value to enable a maximum total power to the WSS 32 (step S3). The amplifiers 38, 60 have their default EDFA total power limit set to the maximum total output power, considering a full-fill condition or based on laser safety power limit.

The downstream Total Launch Power (dTLP) target is derived from knowing the downstream span loss and fiber type (step S5). Note, the span loss can be measured as described herein. The fiber type can be manually entered or automatically detected. For example, a technique for automatically detecting fiber type is described in commonly-assigned U.S. patent application Ser. No. 15/828,497, filed Dec. 1, 2017, and entitled "METHODS AND ASSEMBLIES FOR USING ELECTROSTRICTION TO CHARACTERIZE PROPERTIES OF OPTICAL FIBER," the contents of which are incorporated herein by reference.

The target launch power tilt is determined based on dTLP and downstream span length and fiber type (step S6). If no downstream span (e.g., the last amplifier in the section— RLA pre-AMP), the tilt is calculated as 0.

The target launch power profile to fiber with tilt in power spectral density format is derived and set (step S7). To derive the optimal target launch power profile, the following is required. It must be determined if the span is Raman amplified or not. Also, the fiber span loss is required. Linear coefficients are used to calculate the total launch power to fiber and to derive a flat launch profile accordingly. The coefficients are derived for per fiber type to find the maximum per channel power for a specific channel type against span loss. The lower the span loss, the launch power is lowered as well in order not to drive downstream EDFAs at lower gain (and hence poor NF). The fiber type can be determined based on discovered fiber properties (such as effective core area, SRS gain coefficients, Raman gain range, etc.). With Raman in place, launch targets are reduced as the channels gain OSNR with Raman amplification. The coefficients from the per channel launch power target are then used to calculate total launch power considering a flat launch in full-fill spectral condition. The tilt is calculated and applied to the profile. Note, the tilt for the amplifier 66 can be left unchanged since it is the last downstream amplifier.

The OTDR traces (e.g., the office trace) can be used to discover the exact PPL and connection loss before reaching the actual fiber span. The influences how much SRS is generated. The fiber attenuation (dB/km) is another factor that affects SRS. The OTDR trace (e.g., the long trace) is used to determine the discovered fiber attenuation which is used to change the estimated tilt. Fiber attenuation is determined from a slope of the OTDR trace.

In FIG. 7, the following steps are performed sequentially to turn up a link. The sequence can be initiated by a "passing the baton" approach from one node to next. The ROADM transmit direction calibration includes setting EDFA parameters: Target Gain, and gain tilt based on predetermined equations (using measurement data) (step S8). The channel holder 30 is launched to meet the target launch power profile (using a power controller) (step S9). A power controller runs some feedback loop to set the power to achieve the target launch power profile. This completes ROADM calibration at the OADM multiplexer 12, and a token is sent (passing the baton) to downstream (step S10).

The optical amplifier 16 is calibrated once the token is received from upstream. This includes setting Raman gain setting and pump calibration based on upstream span loss and fiber type, and the pumps 48 are enabled. A high or low gain switch mode is set on the optical amplifier 60 which takes repair margin into account for upstream span loss (step S12). The target gain and gain tilt are set on the optical amplifier 60 based on equations (step S13). The maximum total power target is adjusted based on a new target EDFA Total Output Power (TOP) (step S14). The VOA 62 setting is adjusted (step S15). The optical amplifier 60 can have mid-stage equalizers which are also calibrated to achieve the given profile target (using a localized power controller using internal Performance Monitoring (PM) values from an internal OCM in the optical amplifier 60). When calibration is done, it goes back to a loss mode, and the token is passed to the next node (step S18). The same steps are performed at the optical amplifier 18 node.

At the OADM demultiplexer 14, once the token is received from upstream, a similar approach is followed as the OADM multiplexer 12. This includes setting the Raman amplifier 24 settings (step S19). Setting a high/low gain switch mode on the optical amplifier 66 taking repair margin into account for upstream span loss (step S20). The target gain is set based on equations, and no adjustment is made to gain tilt since there are no downstream spans (step S21). The launch power profile is saved at the switch out of the WSS 68 (step S22).

Switchable Line Amplifiers

Figure 8:
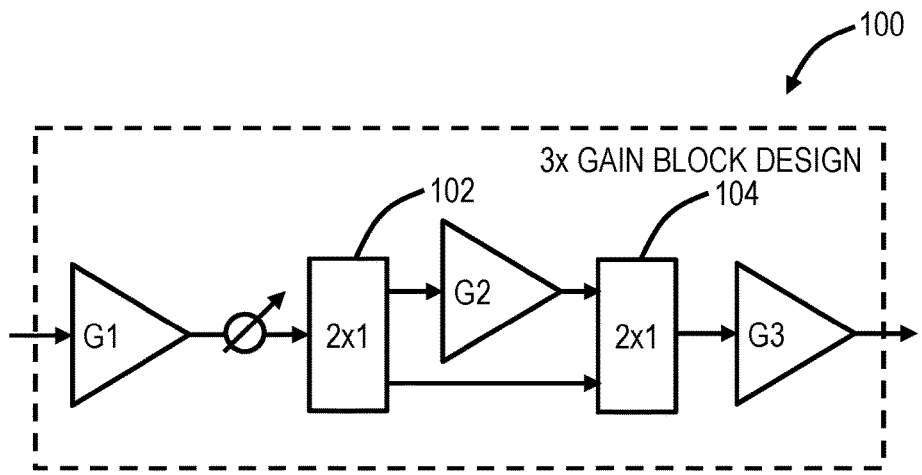
FIG. 8 is a block diagram of a switchable line amplifier for the optical amplifiers.
Figure 9:
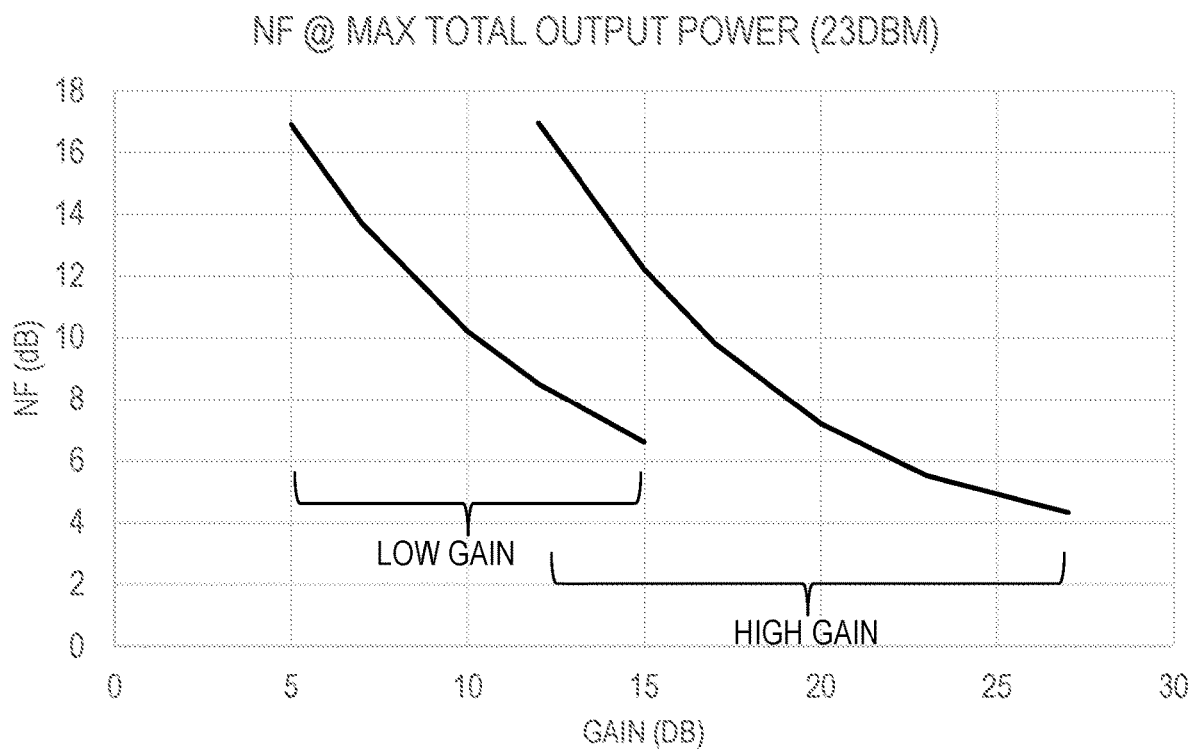
FIG. 9 is a graph of Noise Figure (NF) versus gain for the low gain and high gain state of the switchable line amplifier.

FIG. 8 is a block diagram of a switchable line amplifier 100 for the optical amplifiers 38, 60, 66. The switchable line amplifier 100 includes amplifier modules G1, G2, G3 and switches 102, 104 (2×1 switches). The switchable line amplifier 100 includes EDFAs that can be remotely configured to operate in two gain states: a low gain state, using the amplifier modules G1, G3, and a high gain state, using the amplifier modules G1, G2, G3, based on the settings of the switches 102, 104. There is usually a gain mask overlap between the two states. The advantage of having switchable gain states in an EDFA design to cover a large gain range, instead of having a single gain state is to achieve better Noise Figure (NF) performance at different link requirements. EDFAs are typically designed to provide optimal NF at Design Flat Gain (DFG) and maximum Total Output Power (TOP). A single gain state suffers badly with high noise (poor NF) at lower gain ranges. The two-state solution allows EDFAs to operate remotely at low gain states with optimal NF for shorter spans, as well as at high gain states at longer spans without necessarily changing the circuit pack or gain module from span to span. Note that, any gain state change on the EDFA is a traffic impacting operation, and hence, careful attention is placed at the planning cycle to get the correct gain state initially before placing traffic so that traffic can always survive with least performance penalty. FIG. 9 is a graph of Noise Figure (NF) versus gain for the low gain and high gain state of the switchable line amplifier 100.

Figure 10:
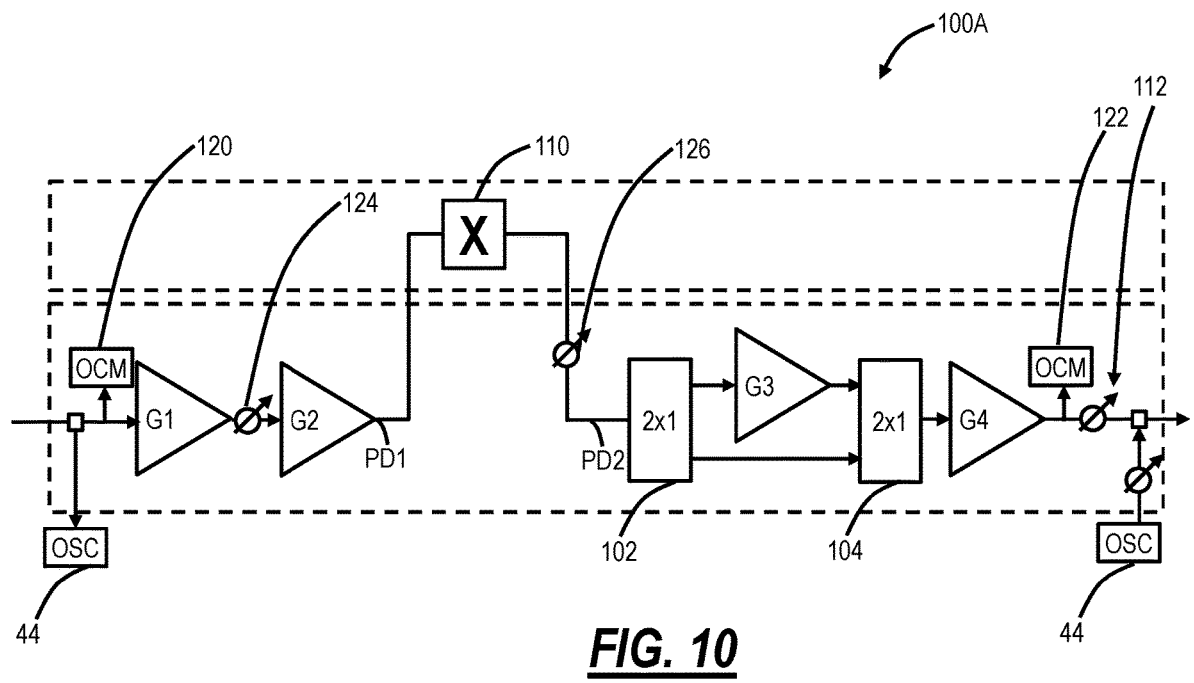
FIG. 10 is a block diagram of a switchable line amplifier with a mid-stage equalizer and post-VOAs.
Figure 11:
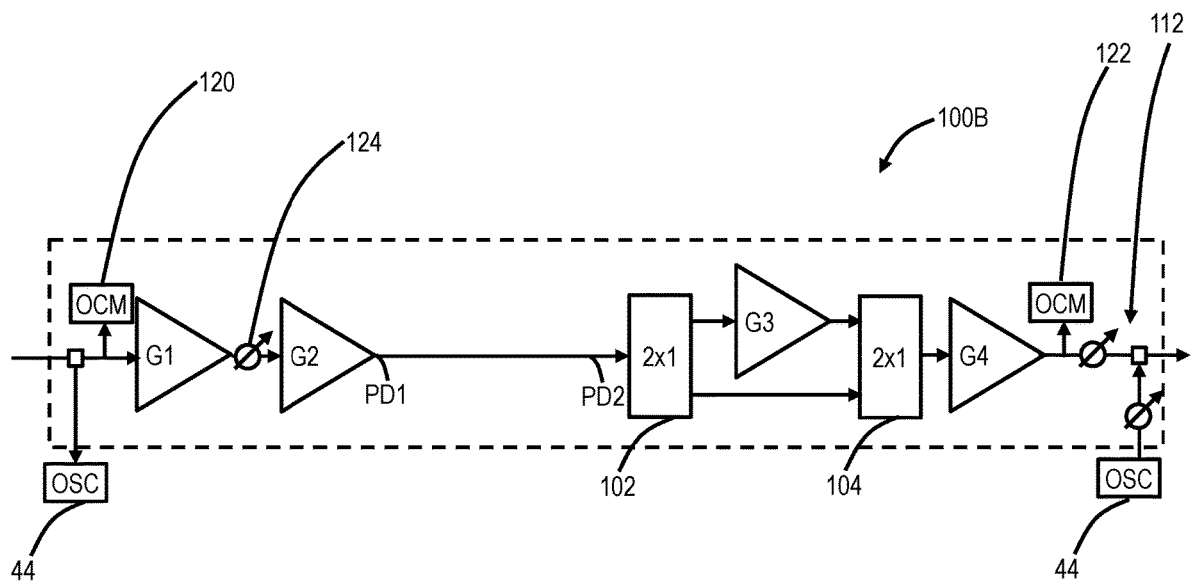
FIG. 11 is a block diagram of a switchable line amplifier with a mid-stage and post-VOAs.
Figure 12:
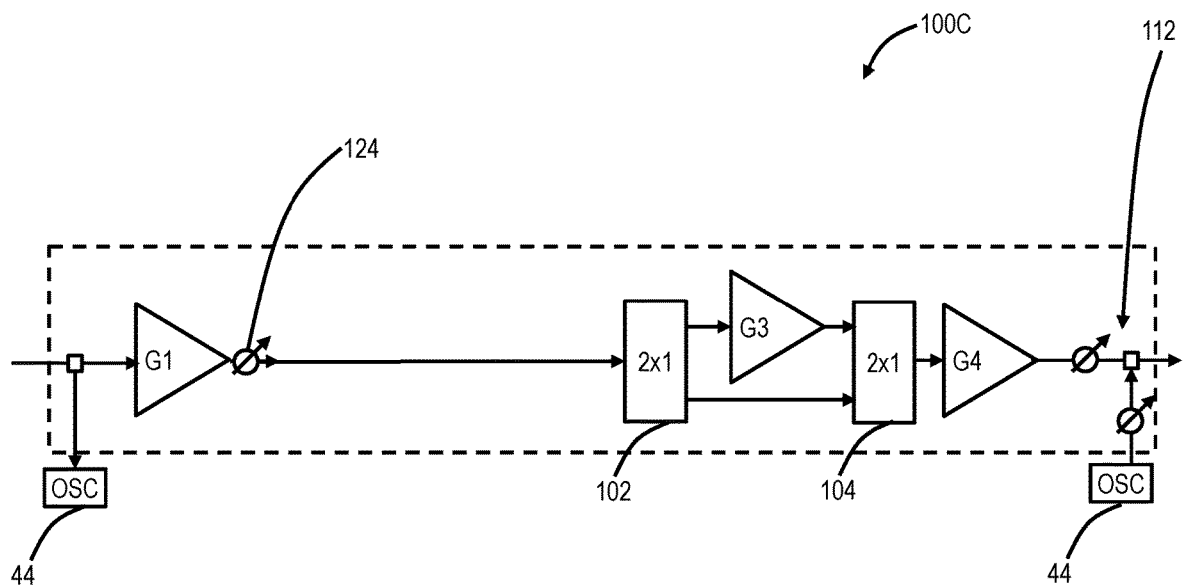
FIG. 12 is a block diagram of a switchable line amplifier with a mid-stage and post-VOAs.

FIG. 10 is a block diagram of a switchable line amplifier 100A with a mid-stage equalizer 110 and post-VOAs 112. FIG. 11 is a block diagram of a switchable line amplifier 100B with a mid-stage and post-VOAs 112. FIG. 12 is a block diagram of a switchable line amplifier 100C with a mid-stage and post-VOAs 112. The mid-stage equalizer 110 provides a Dynamic Gain Flattening Filter (DGFF) function. The switchable line amplifier 100A can accommodate both SRS and ripple. The switchable line amplifier 100B can accommodate the linear SRS component, but not ripple. The switchable line amplifiers 100A, 100B are configured for deployment at in-line optical amplifier sites, i.e., EDFA nodes. The switchable line amplifier 100A can be referred to as a Dual Line Amplifier with Equalization (DLE). The switchable line amplifier 100B can be referred to as a Dual Line Amplifier with Monitoring (DLM). The switchable line amplifier 100C is configured for deployment at the OADM multiplexer 12 and the OADM demultiplexer 14, i.e., the ROADM nodes, and can be referred to as a Dual Line Amplifier (DLA).

Each of the switchable line amplifiers 100A, 100B include four amplifier modules G1, G2, G3, G4, the switches 102, 104, OCM 120, 122 at an input and output port, respectively, the OSCs 44 at the input and output port, respectively, and a VOA 124 between the amplifier modules G1, G2. The switchable line amplifiers 100A, 100B further include photodetectors PD1, PD2 between the amplifier module G2 and the switch 102. The switchable line amplifier 100A includes the mid-stage equalizer 110 and a VOA 126 between the amplifier module G2 and the switch 102, whereas the switchable line amplifier 100B does not. The switchable line amplifier 100C includes three amplifier modules G1, G3, G4, the switches 102, 104, the VOA 124, the OSC 44, and the post-VOA 112. The switchable line amplifier 100C has no OCMs at in or at out ports, nor has any DGFF functions.

Figure 13:
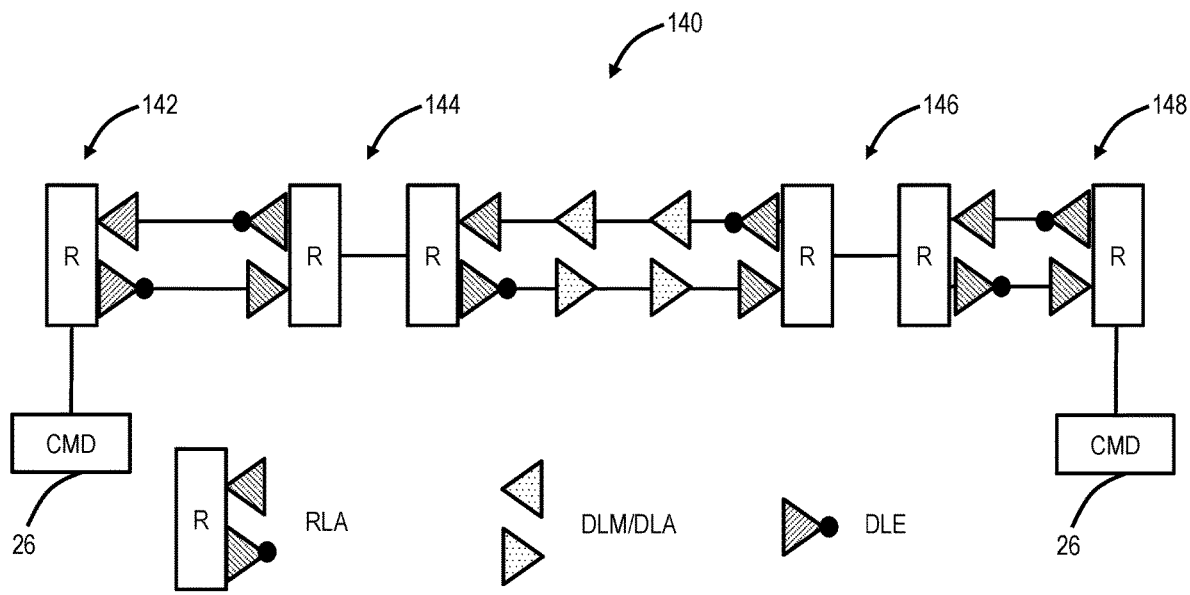
FIG. 13 is a network diagram of an optical network illustrating deployment of a Dual Line Amplifier (DLA), Dual Line Amplifier with Monitoring (DLM), Dual Line Amplifier with Equalization (DLE), and Raman Line Amplifiers (RLA).

FIG. 13 is a network diagram of an optical network 140 illustrating deployment of DLA, DLM, DLE, and Raman amplifiers. The optical network 140 includes nodes 142, 144, 146, 148 which are each OADM nodes. The nodes 144, 146 are express nodes and the nodes 142, 148 are add/drop in this example. The DLM/DLA amplifiers are deployed at intermediate line amplifier nodes between the nodes 144, 146. The DLE amplifiers are deployed as post amplifiers. The automatic link calibration can treat DLM/DLAs similar to DLEs except that instead of deriving a gain profile over the spectrum, it will use a flat gain target for DLM/DLAs and there will be no mid-stage pixel adjustments to compensate ripples due to lack of the DGFF function. DLMs can be present in multiple spans between two ROADMs, and in between DLEs, i.e., a DLE can be responsible for taking out ripples at calibration from multiple upstream spans equipped with DLMs. An example of the DLA, DLM, DLE, and Raman amplifiers is described in commonly-assigned U.S. Pat. No. 8,873,135, issued Oct. 28, 2014, and entitled "Extended dynamic range optical amplifier," the contents of which are incorporated herein by reference.

Figure 14:
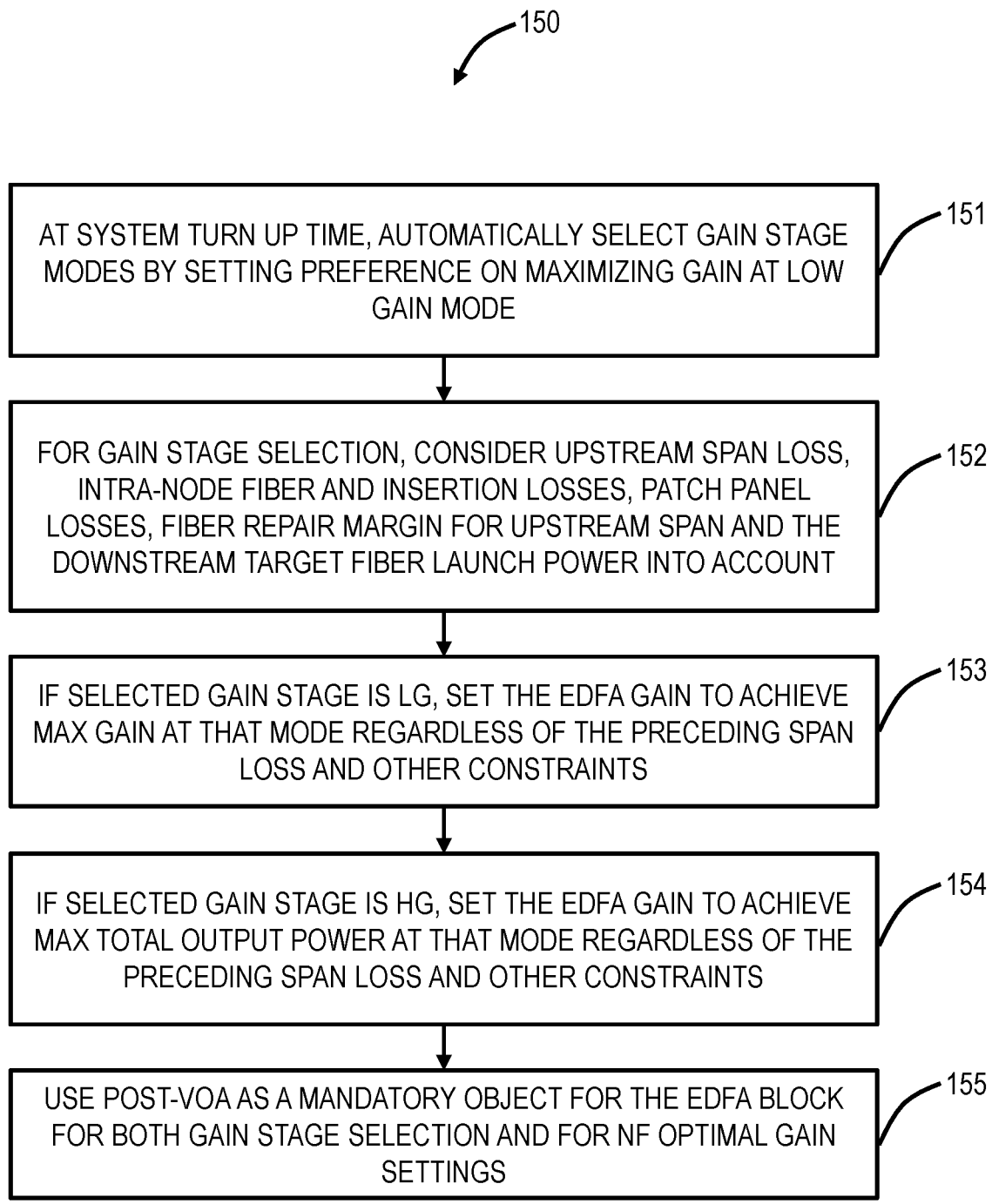
FIG. 14 is a flowchart of a switchable line amplifier gain stage selection process.

FIG. 14 is a flowchart of a switchable line amplifier gain stage selection process 150. The switchable line amplifier gain stage selection process 150 determines a decision locally on each EDFA node, instead of relying on offline planning tool. At system turn up time, the process 150 includes automatically selecting gain stage modes by setting preference on maximizing gain at a low gain mode (step 151). For gain stage selection, the process 150 includes considering upstream span loss, intra-node fiber and insertion losses, patch panel losses, fiber repair margin for upstream span and the downstream target fiber launch power into account (step 152). Of course, the automatic gain stage selection can be performed on a centralized management system as well considering currently measured fiber loss parameters and can be pushed to the EDFA node.

For gain stage selection, an objective is to keep the NF low on the EDFA regardless of the mode selection. Priority is given on maximizing gain at a low gain mode first, and, if not possible, then switching to a high gain mode. If Low Gain (LG) is selected, the EDFA gain is set to maximum regardless of preceding span loss and other constraints, and then the post-VOA 112 attenuation is adjusted to meet downstream launch power target (step 153). If High Gain (HG) is selected, the EDFA gain is set to achieve maximum total output power regardless of the preceding span loss and other constraints, and then the post-VOA 112 attenuation is adjusted to meet downstream launch power target (step 154). A post-VOA 112 is used as a mandatory object for the EDFA block for both gain stage selection and for NF optimal gain settings (step 155).

Controller Details

Figure 15:
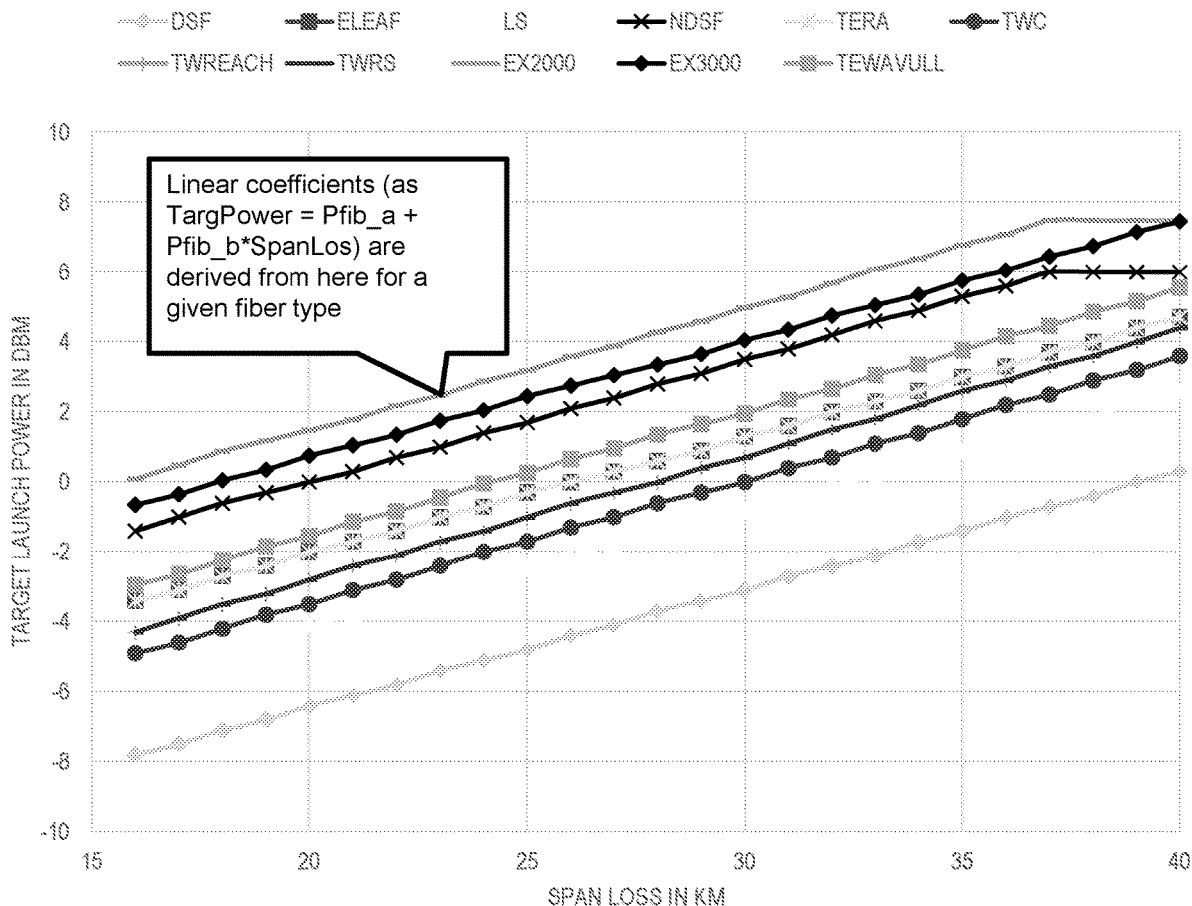
FIGS. 15 and 16 are graphs for deriving the linear coefficients for the target launch power profile for various fiber types with an EDFA-only (FIG. 15) and with Raman (FIG. 16).
Figure 16:
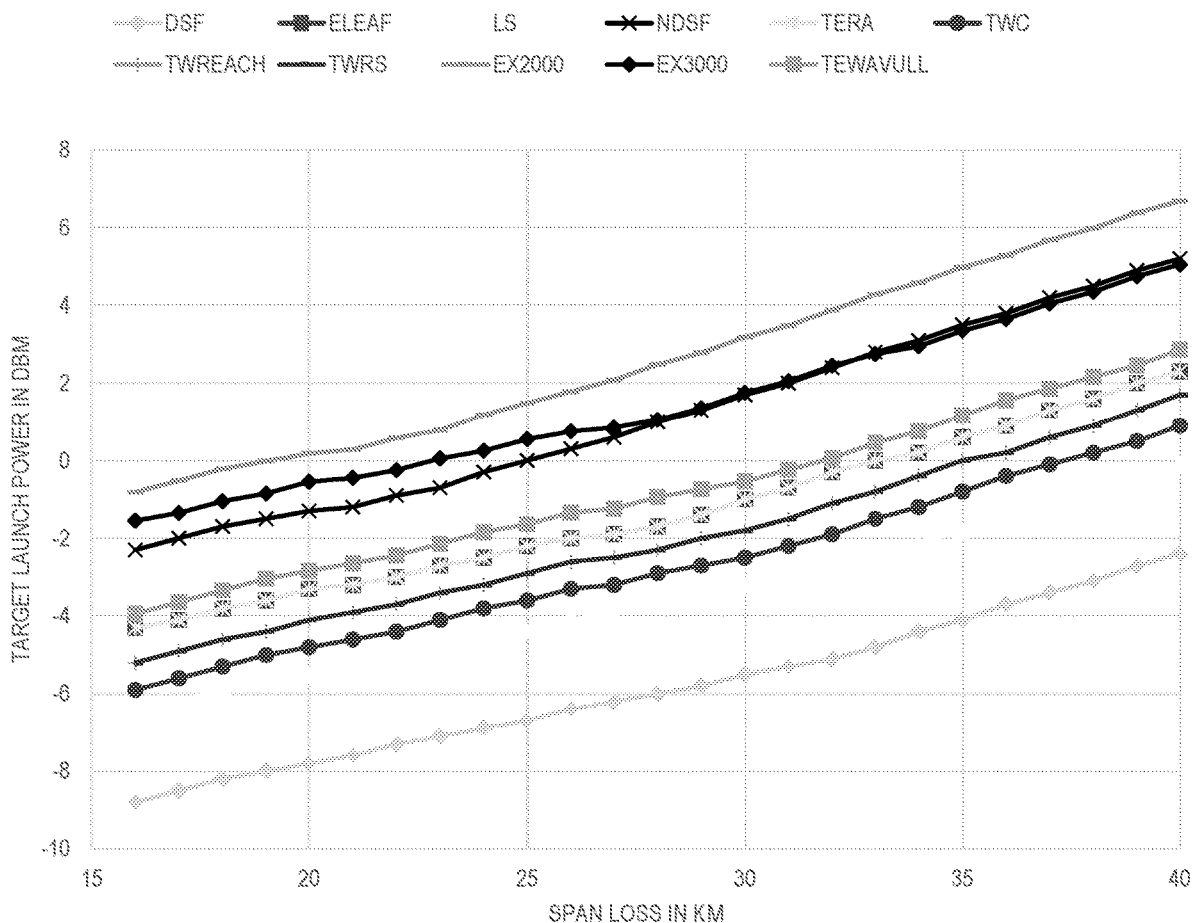

FIGS. 15 and 16 are graphs for deriving the linear coefficients for the target launch power profile for various fiber types with an EDFA-only (FIG. 15) and with Raman (FIG. 16). The following table includes example linear coefficients for different fiber types.

| Fiber Type | A_eff (µm^2) | EDFA Only Pfib_a | EDFA only Pfib_b | EDFA + Raman Pfib_a | EDFA + Raman Pfib_b |
|---|---|---|---|---|---|
| ALLWAVE | 79.6 | −6.5914 | 0.3327 | −7.8797 | 0.3228 |
| Dispersion Shifted Single Mode Fiber | 46 | −13.204 | 0.3378 | −13.037 | 0.2571 |
| Enhanced Effective Area Fiber | 71.5 | −8.7745 | 0.3362 | −9.0126 | 0.2746 |
| Ultra-low-loss & Large effective area fiber | 112 | −5.2474 | 0.3288 | −6.273 | 0.319 |
| Freelight | 71.5 | −8.7745 | 0.3362 | −9.0126 | 0.2746 |
| Lambda Shifted Single Mode Fiber | 55 | −10.904 | 0.3378 | −10.737 | 0.2571 |
| Large Effective Area Fiber | 71.5 | −8.7745 | 0.3362 | −9.0126 | 0.2746 |
| Non-Dispersion Shifted Fiber | 79.6 | −6.5914 | 0.3327 | −7.8797 | 0.3228 |
| NDSF Low Water Peak | 79.6 | −6.5914 | 0.3327 | −7.8797 | 0.3228 |
| Other | 79.6 | −6.5914 | 0.3327 | −7.8797 | 0.3228 |
| Unknown | 79.6 | −6.5914 | 0.3327 | −7.8797 | 0.3228 |
| Pure Silica Fiber | 76 | −6.5914 | 0.3327 | −7.8797 | 0.3228 |
| Teralight | 63 | −8.7745 | 0.3362 | −9.0126 | 0.2746 |
| TeraWave Ultra Low Loss fiber | 125 | −7.0511 | 0.282 | −8.4293 | 0.2736 |
| True Wave Classic | 51.7 | −10.531 | 0.3527 | −10.428 | 0.2748 |
| TrueWave Plus | 51.7 | −10.531 | 0.3527 | −10.428 | 0.2748 |
| TrueWave Reach | 55 | −9.9828 | 0.3584 | −9.8345 | 0.2787 |
| TrueWave Reduced Slope | 51.7 | −9.9828 | 0.3584 | −9.8345 | 0.2787 |
| Ultra-low-loss & Very large area-effective area fiber | 150 | −5.1574 | 0.2799 | −6.1654 | 0.2716 |
| MetroCor fiber | 51.5 | −9.9828 | 0.3584 | −9.8345 | 0.2787 |

The foregoing equations are predetermined, offline, but the values are computed real-time/online based on automatically measured parameters at installation or at calibration (such as based on fiber type, measured fiber loss, repair margins, retrieving factory calibrated data points from each card). This is the key difference where what is deployed in the system is used instead of using any off-line data points.

To find the optimal PSD launch profile per span, live in-skin OTDR data points are used to fine the exact "lumped" losses or patch panel losses before the downstream fiber span to find out the actual SRS. All gain/loss actuators in the link are set in a sequence that includes a list of variables, and some of which, would be either almost impossible or always be wrong if set using offline calculations. This includes setting EDFA gain modes (HG or LG) and gain values by finding a balance between Raman gain and required EDFA gain. This is also done on offline tools by heavily penalizing each span with EOL pessimistic loss and repair margins that sometimes select the wrong gain mode and hence penalizing the performance with bad NF. This also includes setting EDFA mid-stage attenuations (DLE) to take out ripple, SRS, gain-tilt, WDL, SHB effects coming from the upstream span. The approach herein will be using each card's factory calibration data points as typically stored on the card. An offline tool uses statistical or pessimistic data points to focus on the worst case which is why they often become wrong. The DLE implementation is complex and requires a fixed mid-stage loss over the internal equalizer or else the output profile becomes tilted. This is why, without knowing the card specific insertion loss and other calibrated data points along with measured total power readings, it would be almost impossible to set the actuators using an offline tool.

When calibrating all the above actuators, it is done as closely as possible where the system will operate at full-fill spectral loading condition. This is where the channel holder 30 is used to emulate actual channel loading condition at the targeted launch profile so that the SRS, tilt, ripple, etc., i.e., the measurement reflects the full-fill spectral loading condition. A hop by hop approach is used where each node calibrates on its own and passes the token to next without any centralized or end to end coordination. This alleviates dependency on east-west communication.

The automatic link calibration process 70 automatically turns up an optical link with system measured parameters, considering actually deployed fiber plants and its characteristics, lumped losses or patch panel losses before it hits actual fiber spans and the card calibration components (such as IL, DGT, mid-stage loss) that play a significant role on calibrating optical links and cannot be fully handled with offline planning tools.

The Total Launch Power (TLP) to Fiber=Pfib_a+ Pfib_b*spanLoss+10*Log$_{10}$(Max Channel Count); If TLP>Max TOP, Set TLP=MaxTOP, else TLP as is. Target Power resolution bandwidth (RBW)=12.5 GHz.

$$Pfib_{RBW} = TLP - 10 * \log_{10}\left(\text{Max Channel Count} * \frac{\text{Ref Channel Bandwidth}}{RBW}\right);$$

$$PSD12.5 \text{ GHz}|\text{Line Out Port} = TLP - 10 * \log_{10}\left(\frac{(196.100 - 191.325) * 1000}{12.5}\right);$$

"4775 GHz = C – band usable BW"

The Gain Tilt Offset can be calculated as the following:

GT=(Tilt$_{fiber}$+Tilt$_{Sig\ Raman}$)

Where Tilt$_{fiber}$ is the Fiber tilt in dB and Tilt$_{Sig\ Raman}$ is the Signal Raman Tilt in dB.

Fiber Tilt (dB) is as follows:

Tilt$_{fiber}$ Fiber Tilt(dB)=−0.00843*Len Fiber

Where Len$_{Fiber}$ is the downstream fiber length in km. Can be extracted from the OTDR measurement.

The Raman Signal Tilt (dB) is

Tilt$_{Sig\ Raman}$=(−P$_{out}$/100)*(79.6/Aeff)*1.2, where

P$_{out}$ is the downstream total launch power (dTLP) in mW to be divided by 100 mW. Aeff is the effective area based on the fiber type and is taken from the table in next slide. 79.6 is the default effective area for NDSF fiber. 1.2 (in dB) is a factor of the measured tilt for a 96 channel system bandwidth. It is a function of the amplifier bandwidth.

The derived gain tilt is applied to the target launch power profile. Tilt can be applied at the center of C-band (193.75000 THz). A negative tilt value implies the blue end spectrum gets higher in launch power and red end spectrum gets lower. This means, in the frequency domain, lower frequency end gets lower power, and higher frequency end gets higher.

The profile coefficients can be changed with measured PPL and fiber attenuation. Again, OTDR traces (e.g., office trace) can be used to discover the exact PPL (patch panel loss)+connector loss over the fiber management system (FMS) before the hitting the actual fiber span. The PPL makes a big difference in how much SRS will generate on the line system. Again, the fiber attenuation (dB/km) is another factor that affects SRS. The OTDR trace (e.g., long trace) is used to determine fiber attenuation to change the estimated tilt. NE level local controllers can read raw OTDR traces (office trace versus long trace) from the card to figure out PPL, fiber attenuation, etc.

For setting the TOP EDFA, a target EDFA TOP=23 dBm (calibrated at circuit pack faceplate). The target total launch power to downstream fiber (dTLP) is known. The Gain clamp Target=Target EDFA TOP+1 dB; EDFA Target Gain=Target EDFA TOP−EDFA IN; Target VOA Attenuation=Target EDFA TOP−SRA (Raman) IL−PPL−dTLP. This is used to set the VOA at the Raman amplifier. This approach may have an additional OSNR penalty if used in DLEs as this may drive the DLE at "High Gain" switch mode based on different fiber types. Hence, VOA settings at DLEs require additional considerations.

For the OADM multiplexer 12 transmit direction calibration, the EDFA Target Gain=Minimum Gain+90% of Gain Range; Minimum Gain=10 dB; Max Gain=20 dB; Gain Range=20−10=10 dB; Target Gain=19 dB; Set Gain tilt as calculated previously; One time set at calibration & forget.

Figure 17:
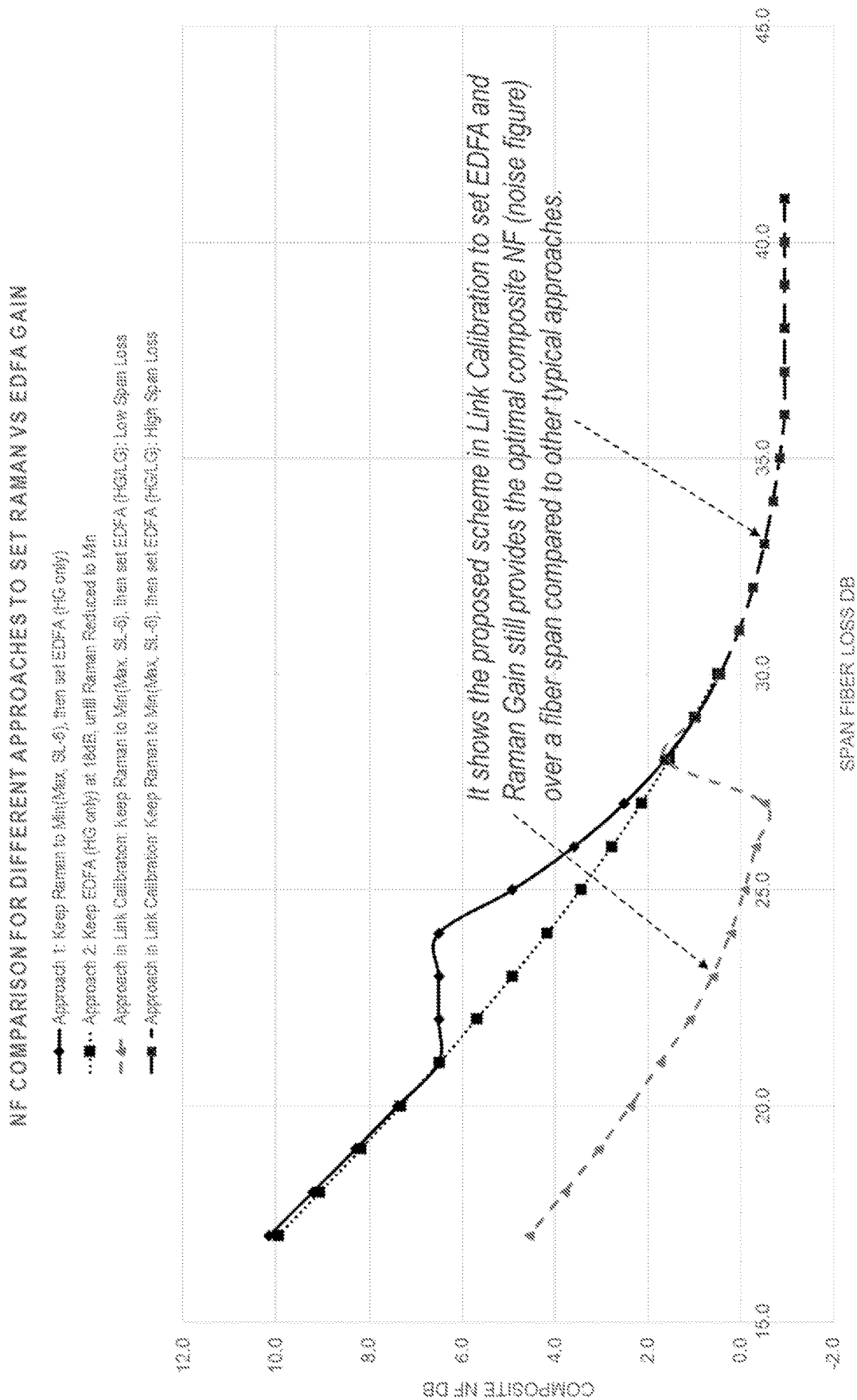
FIG. 17 is a graph of composite Noise Figure (NF) versus span loss for different approaches to balance between EDFA and Raman.

For an amplifier node calibration, there are conventional approaches to set a balance between EDFA and Raman gain to ensure optimal noise figure (NF) is achieved for a given fiber span, such as driving the Raman gain to maximum and operating the EDFA at one switch mode only (such as at high gain only), or keeping the EDFA gain at its optimal NF position in high gain mode (say at 18 dB), and then playing with Raman gain to achieve a site specific composite NF. The composite NF results of these different approaches for a given fiber span (over different span losses) is illustrated in FIG. 17. Compared to these, the proposed approach is to keep the Raman gain either at maximum gain (for longer span) or at the maximum achievable gain with non-linear limit (for short span to reduce double Rayleigh Scattering impact) based on fiber type, and then deciding on EDFA gain switch modes, such as taking the approach of keeping the EDFA either at low gain mode if possible, or if the EDFA has to be at high gain due to lack of dynamic range, then driving the EDFA power to maximum, and then later using the post-VOA attenuation to achieve the next downstream span total launch power (dTLP). FIG. 17 shows that the approach taken at the link calibration still provides the best composite NF for a given fiber span compared to other approaches.

The gain calibration starts only after the token is received from upstream and the Raman amplifier is determined needed. The Raman amplifier is expected to derive a Max/Min Gain range for a given fiber regardless of the provisioned fiber type. For the Raman gain settings, the upstream fiber loss and fiber type are known, upstream fiber loss=upstream span loss−PPL; upstream span loss reported by the telemetry signal without Raman Gain. The maximum Raman gain w/ Non-linear limit=Min(Max_Gain per fiber type, Fiber loss−X dB), where X=6; Target Raman gain=Min(Raman MaxGain for Fiber type, Max Raman Gain w/Non-Linear Limit).

For deciding the gain switch mode of the switchable line amplifier 100, using a maximum LG Approach and considering Fiber Repair Margin, fiber in-service degradation=1 dB; (Default value; can be provisionable); Target Max EDFA Gain at Low Gain mode=14 dB; Take a snapshot of the measured PSD profile from the DLE input (from the internal OCM). Scale the measured profile considering fiber repair margin; the target output PSD profile is already known; Scale the output PSD profile at DLE out considering (Raman IL+PPL); calculate the target gain profile w/margin considering 0 dB VOA attenuation (=Target DLE out profile−Measured profile at DLE input w/margin); perform a linear regression fit on the grain profile curve. The mean should give the EDFA Target Gain with 0 dB VOA attenuation; EDFA Target Gain w/ margin=Max(Target Gain with 0 dB VOA, Target Max EDFA Gain at LG); If EDFA Target Gain w/margin>15 dB, Set "High Gain," else, Set "Low Gain."

For determining target gain and VOA attenuation, if (EDFA Mode="Low Gain"), use maximum Low Gain (LG) Approach, after Raman calibration is done; Target Max EDFA Gain at Low Gain mode=14 dB; Use the snapshot of the measured PSD profile from DLE input (from the internal OCM); the target output PSD profile is already known; scale the output PSD profile at DLE out considering (SRA IL+PPL); calculate the target gain profile considering 0 dB VOA attenuation (=Target DLE out profile−Measured profile at DLE input); perform a linear regression fit on the gain profile curve. The mean should give the EDFA Target Gain with 0 dB VOA attenuation; EDFA Target Gain=Max(Target Gain with 0 dB VOA, Target Max EDFA Gain at LG); target EDFA TOP=measured EDFA IN+EDFA Target Gain; Gain clamp Target=Target EDFA TOP+1 dB; Target VOA Attenuation=Target EDFA TOP−SRA IL−PPL−dTLP.

If (EDFA Mode="High Gain"), use maximum TOP approach, after Raman calibration is done; Target EDFA TOP=23 dBm; Gain clamp Target=Target EDFA TOP+1 dB; use the snapshot of the measured PSD profile from DLE input (from the internal OCM); the target output PSD profile to fiber is already known; calculate downstream total launch power (dTLP); scale the output PSD profile at EDFA out considering (Target EDFA TOP−dTLP); calculate the target gain profile (=Target EDFA out profile−Measured profile at DLE input); perform a linear regression fit on the gain profile curve. The mean should give the EDFA Target Gain to achieve the desired Max TOP; EDFA Target Gain=mean (target gain profile); Target VOA Attenuation=Target EDFA TOP−SRA IL−PPL−dTLP.

For DLE power calibration, the average Loss between PD1 and PD2 should be greater than or equal to the Target Mid-Span Loss (MSL)=8 dB (=DGFF IL+DGFF attenuation). The Average Loss should be greater than the Target MSL (8 dB) which creates almost a dB to dB tilt on the DLE output. A 1 dB higher average loss is expected to create almost−0.8 dB gain tilt on the output (blue as the highest gain, red as the lowest). The Target MSL per card to maintain the flat output profile. The card should provide a measured MSL (=PD1−PD2) value in dB all the times; To start with, all pixel attenuation=0 dB at default. An internal mid-stage VOA in place to maintain the MSL at Target MSL and controlled by the gain block module (similar to internal tilt-VOA). A higher level controller is used to adjust mid-stage pixel losses to achieve the target power profile. An important assumption is that both the input signal and the target PSD profile used during the calibration will have a smooth spectrum (no high-frequency terms).

Alternatively, for DLE power calibration, ensure the EDFA is at a Gain clamp mode. Calculate the tilt from the linear fit of the target gain profile:

$$\text{Linear Tilt} = \frac{m}{(f_{384} - f_1)} = \frac{m}{(191.325 - 196.100)};$$

$$m = \frac{n * \sum XY - \sum X * \sum Y}{n * \sum X^2 - (\sum X)^2};$$

where X is in frequency in THz, and Y is gain profile in dB. Set GaintiltLimit<0, −5>=Linear Tilt from Profile Set the EDFA into power calibration mode, i.e., putting all pixels into power mode. Get the measured Mid-Stage Loss (MSL); Measure output PSD profile in dBm/12.5 GHz using the output OCM (at DLE); Calculate an error on output power profile (=target profile−measured profile)

if Max($|\text{error}|_i$)>dz (0.2 dB), where i=1, 2, 3, . . . , 384×12.5 GHz slices For i=1, 2, 3, . . . , 384×12.5 GHz slices
If $|\text{error}|_i$<dz, set $\text{conv}_i$=0; else $\text{conv}_i$=1;/*0=true, 1=false;
If (!$\text{conv}_i$)
Estimate New Attenuation, $\text{Atten}_{est,i}$=Current Attenuation+Normalized Error=$\text{Attent}_{t,i}$+(0−Min($\text{error}_i$))=$\text{Attent}_{t,i}$−Min($\text{error}_i$))

Push min attenuation to zero; Calculate $\text{TargAtten}_i$=$\text{Atten}_{est,i}$−Min($\text{Atten}_{est,i}$);
If $\text{TargAtten}_i$>18, set $\text{conv}_i$=0; $\text{TargAtten}_i$=18;
else, $\text{conv}_i$=1; $\text{TargAtten}_i$;
Apply the new $\text{TargAtten}_i$ in OLL state
else if Max($|\text{error}|_i$)≤dz (0.2 dB)||sum($\text{conv}_i$)<1, then all are converged and exit the loop For the OADM demultiplexer 14, use the MAX TOP Approach, after Raman calibration is done, regardless of SW MODE selection (HG/LG); Target EDFA TOP=23 dBm; (the max is 25 dBm, but laser safety may limit to 23 dBm); Gain clamp Target=Target EDFA TOP+1 dB; and EDFA Target Gain=Target EDFA TOP−measured EDFA IN.

The equations and calibration process is described here for C-band only, although they are equally applicable for other optical communication bands such as L-band or a combination of C+L band.

Differentiating Traffic Signals with ASE Channel Holders in Optical Networks

When networks are interconnected between ASE- and non-ASE loaded systems with no communication or notification mechanisms between the OMS', photonic controllers operating downstream of an ASE-loaded OMS do not know if an optical signal comes from real transmitting modems, or from ASE-fillers. However, photonic controllers (such as local or sectional controllers running within an OMS), when operating with signals from different baud rates, capacities, and modulation formats, often do differential optimization among the traffic signals to equalize or pre-emphasize incremental SNR or power within the optical section. The problem is, when a traffic signal is replaced with an ASE-filler due to a line-fiber or channel fault in an upstream ASE-loaded section, the differential optimization done in a downstream OMS does not remain valid anymore. In such case, when an ASE-filler shows up to the same power or OSNR level as the original traffic signal expressing from an upstream, it may start causing non-linear penalties to the neighboring traffics, which were deployed without considering the penalties of neighboring non-modulated ASE holders.

In the case of networks with communication between the OMS', explicit communication can be sent out to all downstream sections along the channel path when a channel is replaced with ASE-filler. However, if there is a communication issue anywhere along the 'faulted' channel path, then downstream controllers face the same issue of not being able to differentiate between a traffic signal versus ASE-fillers and keep applying wrong optimization.

In an embodiment, a technique is proposed to differentiate traffic signal with ASE-fillers based on the difference of their spectral shapes that can be used locally by any photonic controllers or applications and can provide differential optimization to each optical signal type accordingly (e.g., SNR or power optimization). More precisely, for a given channel, the process integrates the total power measured over the filter-edge deadband(s) and if the integrated deadband power increases at any given time compared to an expected power level or measured baseline, then the channel is considered as replaced with ASE-fillers from upstream.

Figure 18:
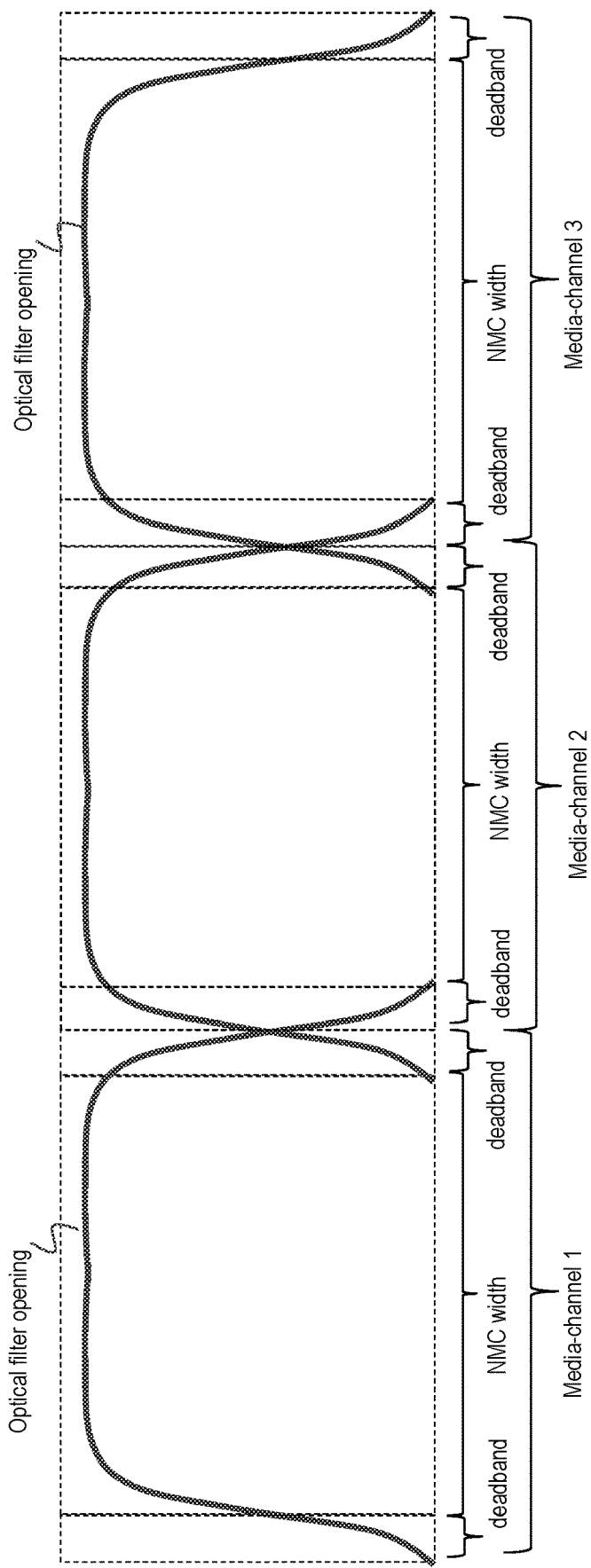
FIG. 18 is a graph of optical spectrum for definitions of a Media Channel (MC), deadband, and a Network Media Channel (NMC).

FIG. 18 is a graph of optical spectrum for definitions of a Media Channel (MC), deadband, and a Network Media Channel (NMC). A Media Channel (MC) is the optical filter opening across an optical medium such as Wavelength Selective Switch (WSS) to add one or more Network Media Channels (NMCs). MCs are identified with start and stop frequencies and cannot overlap with each other. MC width can be different across different media elements along a channel path. A Deadband is the spectral space on each edge of the media channel that covers the filter role off. This is typically half of the total overlapped role off zone of two neighboring media channels. Deadband on each edge can be symmetric or asymmetric depending on the penalty tolerance of the traffic signal with its neighbors. Deadbands are included within the media channel width. A Network Media Channel (NMC) is the end-to-end channel or photonic service entity that requires a homogenous logical spectrum allocation for a given channel across all mediums along a channel path. The key characteristics of the traffic signal or its spectral shape is expected to be confined within the NMC bandwidth. NMC is typically defined with center-frequency and bandwidth that remains common along the channel path. NMC remains confined with a MC width and does not overlap with deadbands or other NMCs within the MC.

Figure 19:
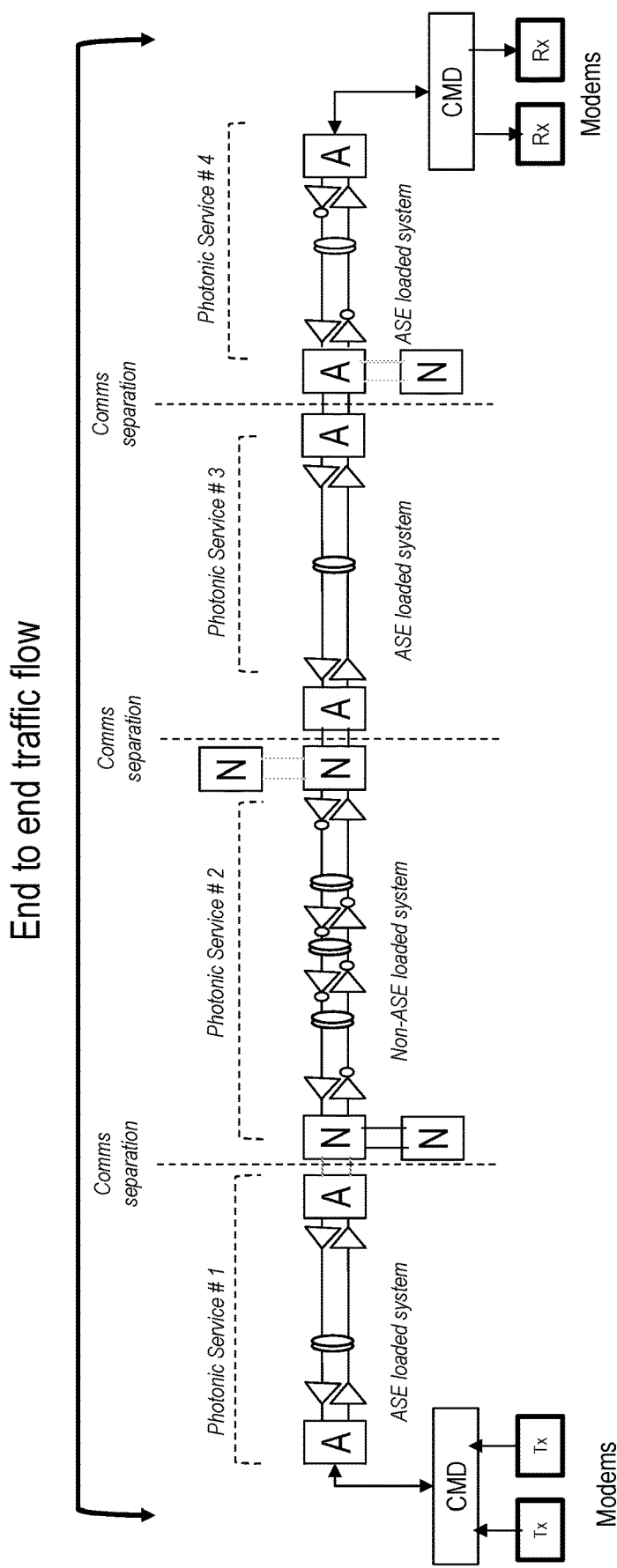
FIG. 19 is a network diagram of a disaggregated network where there is no communication between OMS'.

FIG. 19 is a network diagram of a disaggregated network where there is no communication between OMS'. As described herein, a disaggregated framework or network is one where there is no communication between OMS'. For a given OMS, the upstream OMS can be an ASE-loaded or a non-ASE loaded system, which means the channels coming from upstream sections can be real traffic signals or ASE-fillers. To establish an end-to-end network media channel (NMC), individual photonic services need to be created across each ASE- and non-ASE loaded segment.

When a traffic channel is added, each OMS may have to do its own incremental SNR optimization within its OMS based on its channel fill, neighboring channel presence, capacity or Baud rate of the channels that are added or deleted versus the capacity of already existing channels etc. This is called differential SNR optimization that primarily reduces interference penalties between neighboring channels running at different capacities, Baud rate, transmission mode or modulation formats.

The problem is, when a channel is originated or expressing through an ASE-loaded system, if the signal is faulted (channel power dropped below a threshold or based on a fault notification), signal power is replaced with ASE-fillers and propagated through the rest of the downstream network. In this case, an OMS that was SNR-optimizing a given traffic channel considering its transmission mode (capacity, Baud, modulation etc.) will now provide the same differential treatment to a non-modulated ASE-filler coming from upstream, without knowing the difference between the traffic vs the filler signal. This can be potentially traffic impacting for the neighboring signals due to interference penalty from non-modulated ASE-fillers receiving same launch power or SNR optimization as the faulted modulated signals. The amount of incremental interference penalty will be different per OMS, and will accumulate along the channel path.

This problem is also true for networks having proper communication over the OMS boundaries along the channel path. In such case, when a channel fault takes place upstream, a per channel fault indicator needs to be propagated along the channel path to indicate the channel could potentially be replaced with ASE-fillers along the path if the certain OMS is ASE-managed. Since the channel fault indicator has to travel along the channel path end-to-end, any issue with on communication channels along the channel path will impact that fault-bit propagation. Hence, for robust control design perspective, a local detection on ASE-filler vs traffic signals is more desirable instead of comms dependencies on upstream.

Figure 20:
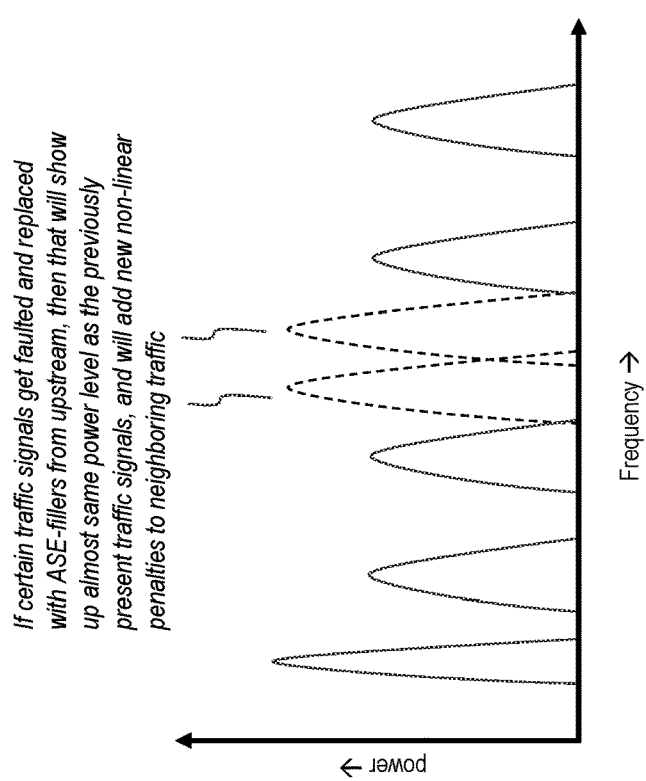
FIG. 20 is graphs of optical spectrum illustrating the problems associated with differentiating between traffic signals and ASE-filled channels.
Figure 20:
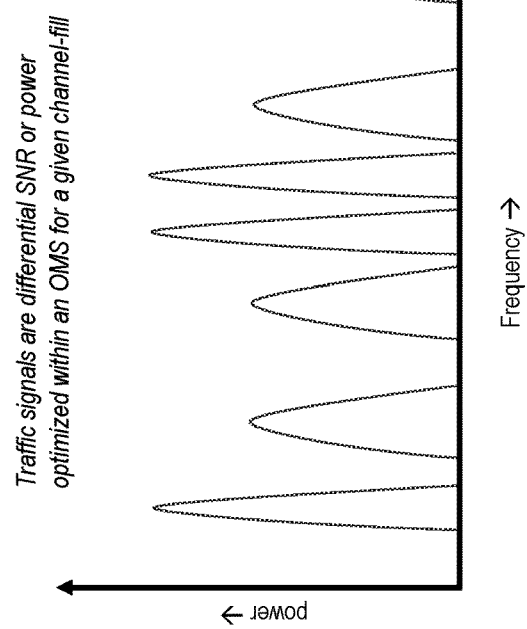

FIG. 20 is graphs of optical spectrum illustrating the problems associated with differentiating between traffic signals and ASE-filled channels.

Conventional solutions depend on communication/notification from upstream and this is not available for disaggregated network or nodal setup, where communication separation exists between OMS boundaries. Even for networks with communication across OMS, a channel fault indicator propagation along the channel path could be impacted for any communication signal outage along the path, causing downstream controllers to end up on a wrong state.

Figure 21:
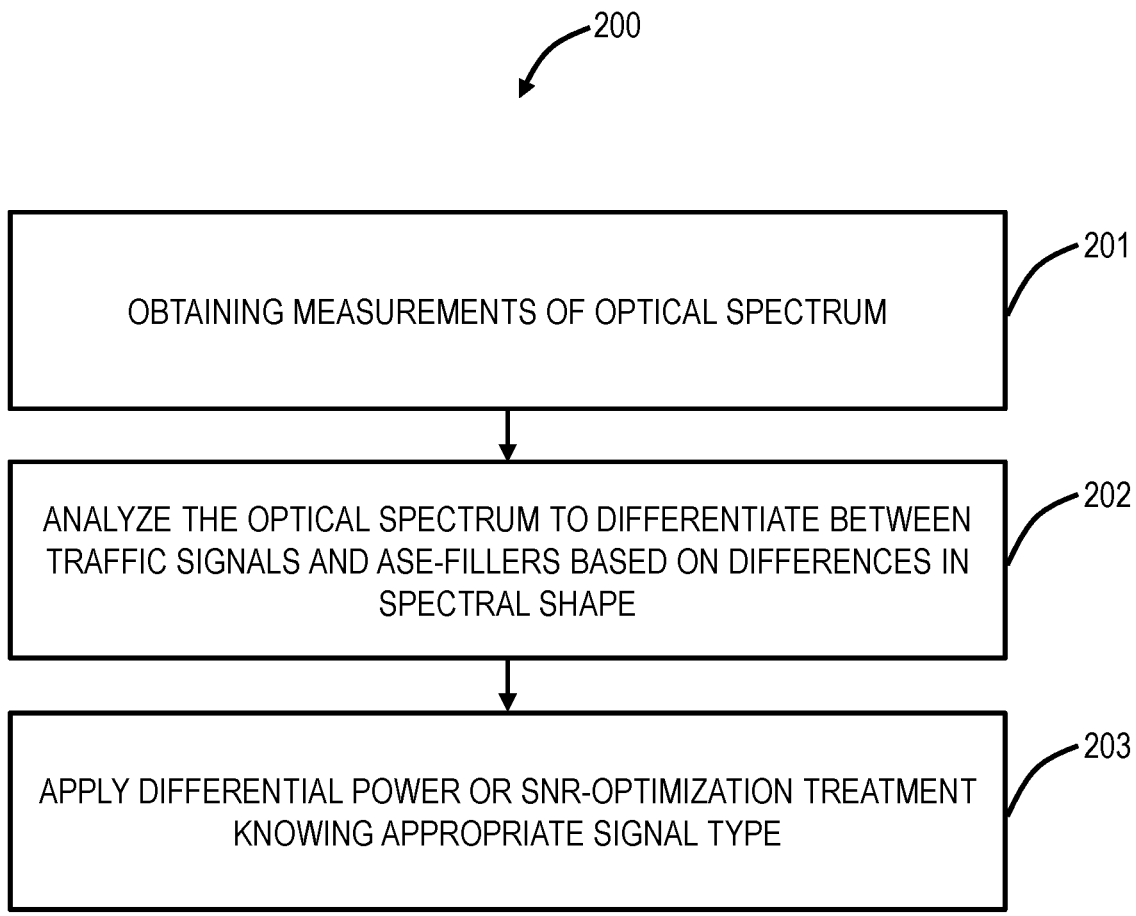
FIG. 21 is a flowchart of a process to differentiate between traffic signals and ASE-fillers based on the difference in their spectral shapes.

FIG. 21 is a flowchart of a process 200 to differentiate between traffic signals and ASE-fillers based on the difference in their spectral shapes. The process 200 contemplates implementation as a method, via a processor, and embodied as instructions stored in a non-transitory computer-readable medium. In an embodiment, the process 200 can be implemented on a local controller on a section-mux or on a section controller running for an OMS.

The process 200 include obtaining measurements of optical spectrum (step 201), analyzing the optical spectrum to differentiate between traffic signals and ASE-fillers based on differences in spectral shape (step 202), and applying differential power or SNR-optimization treatment knowing appropriate signal type, in order to reduce interference penalty on neighboring traffic signals (step 203). More precisely, for a given channel, the process 200 include integrating the total power measured over the media-channel deadband(s) and differentiating them against an expected or baseline power levels to identify the signal type, based on the fact that actual traffic signal is expected to remain confined within the NMC width and not to bleed significant power on the deadband space.

Figure 22:
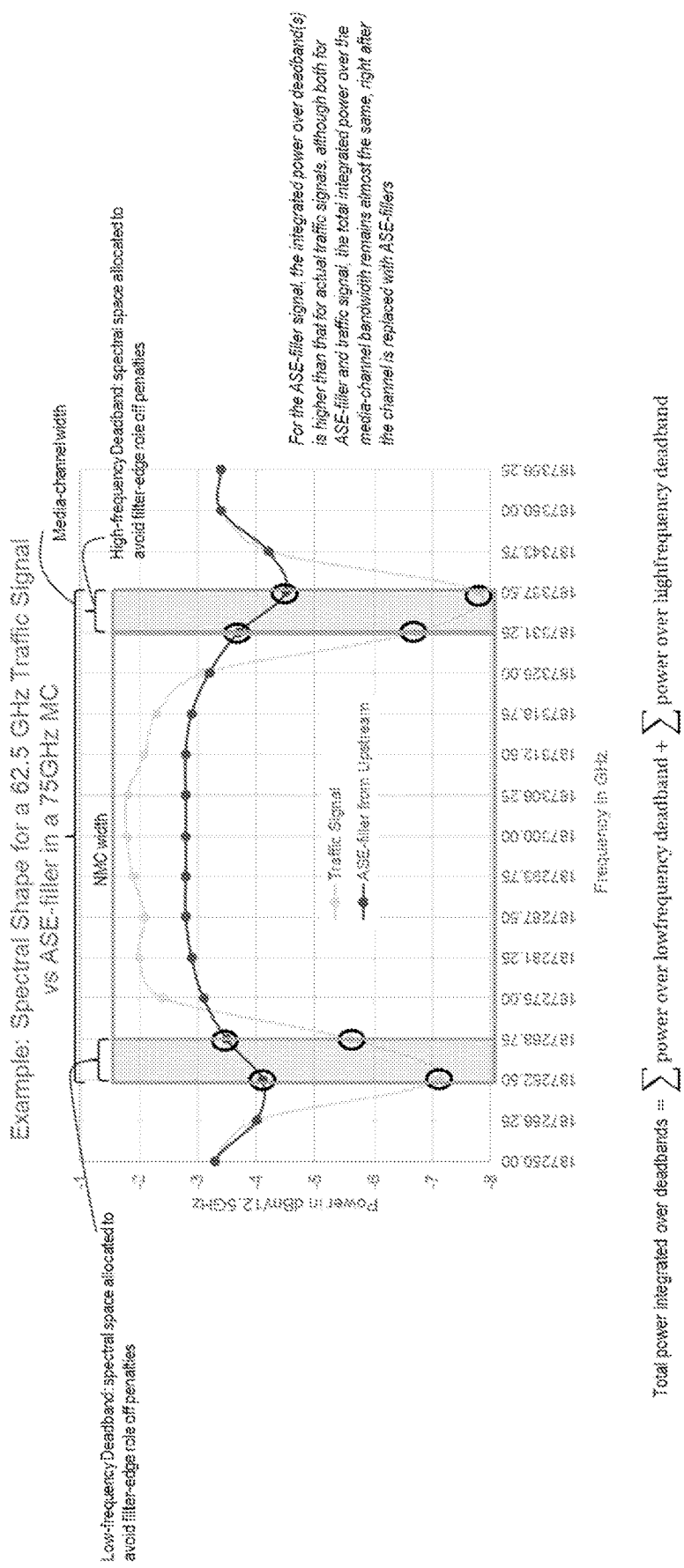
FIG. 22 is a graph of optical spectrum illustrating an example of the process of FIG. 21.

Once the actual signal type is identified (ASE vs traffic) for a given network media channel (NMC), the process 200 includes raising internal flags for controllers accordingly. FIG. 22 is a graph of optical spectrum illustrating an example of the process 200. Specifically, FIG. 22 is the Spectral Shape difference for a 62.5 GHz traffic signal (56 GBaud) (75 GHz media-channel) vs the ASE-filler for that filter space.

At initial capacity add, if the power over the deadband is higher than an expected threshold && the total power over the filter opening meets an expected channel power at mux input or output monitoring, then signal is considered as an ASE-filler, or else a traffic signal. The filter opening is determined based on the NMC width and allocated deadband on each side of the NMC. If determined as an ASE-filler, differential spectral optimization appropriate for ASE-fillers are applied for the channel to minimize the interference on neighbors. If determined as a traffic signal, then the channel is considered as in-service for the OMS, and proper differential SNR or power optimization is applied for the section considering the presence of the traffic signal. Once the signal is considered as "in-service", a new baseline is taken for the integrated deadband power in order to compare with future ASE replacement use case. If for a given signal's expected spectral shape is known (such as 3 dB/10 dB signal bandwidths), then that can be used to define pre-expected thresholds for deadband powers when a traffic signal is present to better differentiate with ASE-fillers.

At steady-state (after channel is in-service), at any given time, if the measured total deadband power increases, and crosses a certain threshold (e.g. >2.5 dB) compared to previously measured baseline for in-service NMC, then the channel is determined to be replaced with ASE-filler due to an upstream fault. If the measured total deadband power goes back close to the previous baseline (e.g., within +/−0.5 dB), then the channel is determined to be replaced back with traffic signal from upstream. In addition, the process 200 also includes integrating total power within the allocated filter opening for an NMC. If the deadband power increases, but the total power over the opened filter space remains relatively constant, then that certainly implicates channel as replaced with upstream ASE-fillers. Note this is an auxiliary check to enhance signal identification.

Although the process 200 is illustrated for a channel with deadband (filter-edge spacing) allocated on each side of the NMC, it is equally applicable for the use case if the deadband is only one-sided. Note that the deadband can be a property of a MC where deadbands are allocated on each side of the MC, or it can be a property of the NMC where it is dynamically allocated on each side of the NMC to reduce its filter penalties regardless of the size of the NMC [e.g., in U.S. Pat. No. 10,735,837, the contents of which are incorporated by reference]. The process 200 integrates power over deadband, and compares with a baseline irrespective of how they are allocated (on MC edge or NMC edge or a combination of both).

The process 200 does not use a snapshot of signal's total power or spectral shapes within a NMC as both could change due to signal's capacity or modulation change, or due to upstream optimization. Instead, the process 200 focuses on integrated power over the deadband, where traffic signals are not expected to spread due to its' capacity or modulation change for a given NMC width.

Of note, the process 200 is implemented locally based on data monitoring from local spectrum monitoring. This means, differentiating without any communication or notification from upstream, utilizing the basic fact that spectral shape of actual traffic signal is expected to remain confined within the NMC width and hence, any unwanted relatively high power beyond the NMC width indicates a non-traffic signal.

In operation, the majority of deployed optical line systems are non-ASE loaded. The proposed approach guarantees link budget between the interworking of non-ASE loaded line systems with ASE-loaded systems.

Automatic Band Augmentation in an In-Service System

The disclosure focuses on developing an "automation orchestrator" or software application that can provide a "plug & play" user experience when the new L-band source and components are introduced in already in-service C+L-band system.

A system is operational with plurality of spectrum bands (such as C-band and L-band), where one-band is carrying traffic, while the other band has no traffic and spectrum-band is filled with ASE generated from a non-channelized broadband ASE source. The band has to be replaced with channelized ASE source so that the band can carry traffic by replacing the channelized ASE slices with traffic channels as part of digital swap in an ASE-managed system. Band replacement has to be done in-service, which means without impacting traffic in another band.

Note, the system with plurality of bands is initially calibrated with a combination of channelized and non-channelized spectrum-bands and all spectrum-ripples are equalized within a certain deadzone while launching to a fiber-span using either by the section-mux WSS or by the DGFF function if present at an Intermediate Line Amplifier (ILA) location. When the band source will be replaced, the accumulated ripple will change in the 1st span of the OMS and that will propagate and amplified over the downstream spans within the OMS. This will impact performance when traffic channels will be added on that spectrum-band. The newly introduced ripple should be taken out per span within OMS as part of band-augmentation.

The system can be calibrated with plurality of bands with no pre-amplified or section-demux dedicated for a given band if that band has no plan on carrying traffic in day 1 installation time. As part of band-augmentation to make it ready for proper traffic carrying, any newly introduced band-amplifiers (such as pre-amplifier or cascaded pre-amplifiers) and section-demux need to be calibrated as well with the rest of the system. This includes setting the target-gain, gain-tilt for each new band-amplifier to achieve their target launch or demux power profile, taking snapshot of calibrated baselines for span losses, measured power profiles, and/or any span transmission profiles if missing earlier for the specific band.

Figure 23:
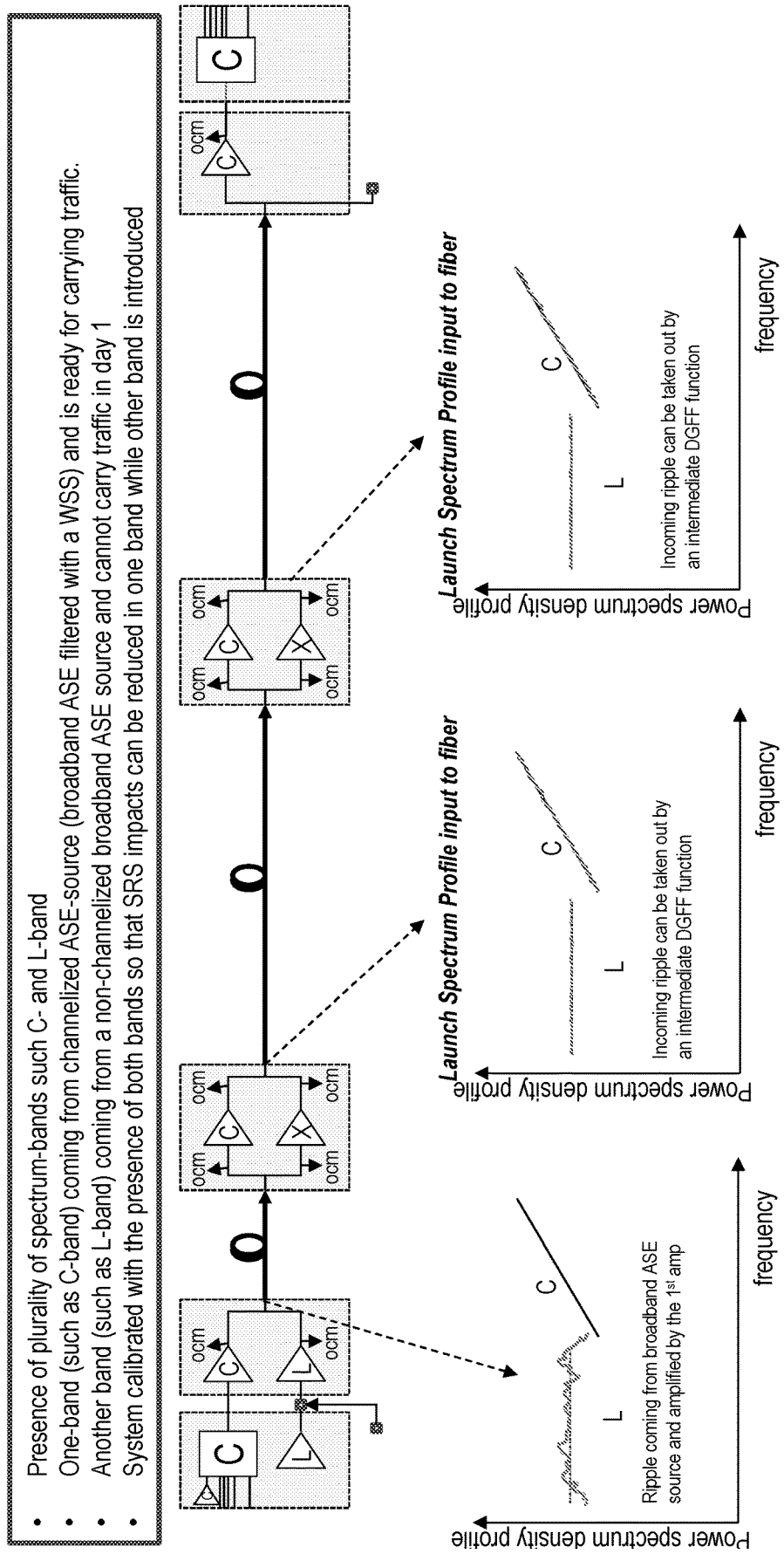
FIG. 23 is a network diagram of an initial day 1 installation of a C+L-band optical line system.
Figure 24:
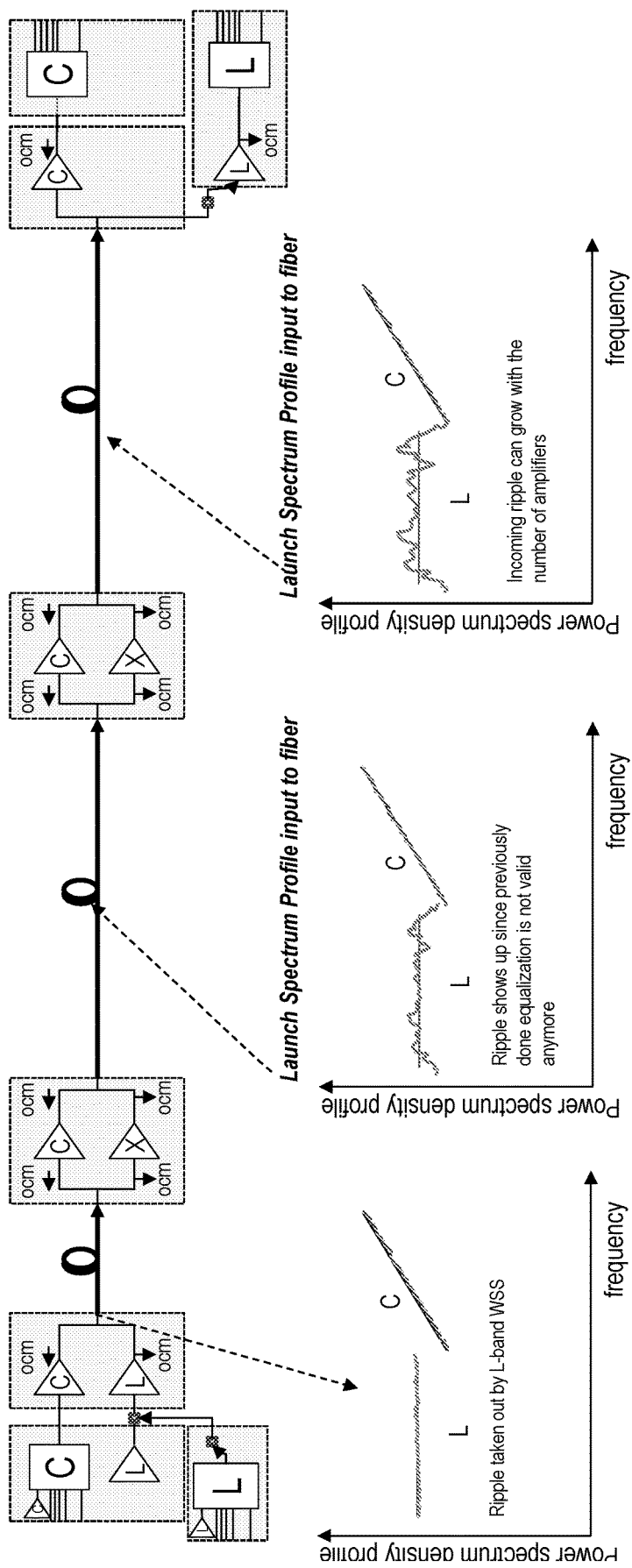
FIG. 24 is a network diagram of a band augmentation installation of the C+L-band optical line system of FIG. 23.

FIG. 23 is a network diagram of an initial day 1 installation of a C+L-band optical line system. FIG. 24 is a network diagram of a band augmentation installation of the C+L-band optical line system of FIG. 23. FIG. 23 is referred to as a "greenfield" installation where FIG. 24 is a "brownfield."

The present disclosure includes a controller application implemented on, within, or connected to the C+L-band optical line system. The system is calibrated with plurality of spectrum-bands, where at least one of the bands is originated from a non-channelized ASE source, the controller detects the presence of a channelized ASE source for a given spectrum-band, ensures the fiber connectivity and required power level from the new channelized ASE source, and then switches from the non-channelized to the new channelized ASE source.

The new channelized ASE source can be located in the same shelf or node as the existing broadband ASE source (non-channelized), or it can be in a completely different shelf or node. If in a different node, communication is required between the two nodes, and the local controller spawns a child-controller instance on the remote node to perform the ASE loading step to achieve a required target power level from the channelized ASE source.

The local controller detects the presence of the channelized ASE source when user provisions the locations of the new ASE source and its components (such as amplifiers, WSS) as part of the control functional-group that can be done at day 1 system installation time, and the corresponding circuit pack (CP) missing diagnostic is cleared associated with the provisioned components.

Figure 25:
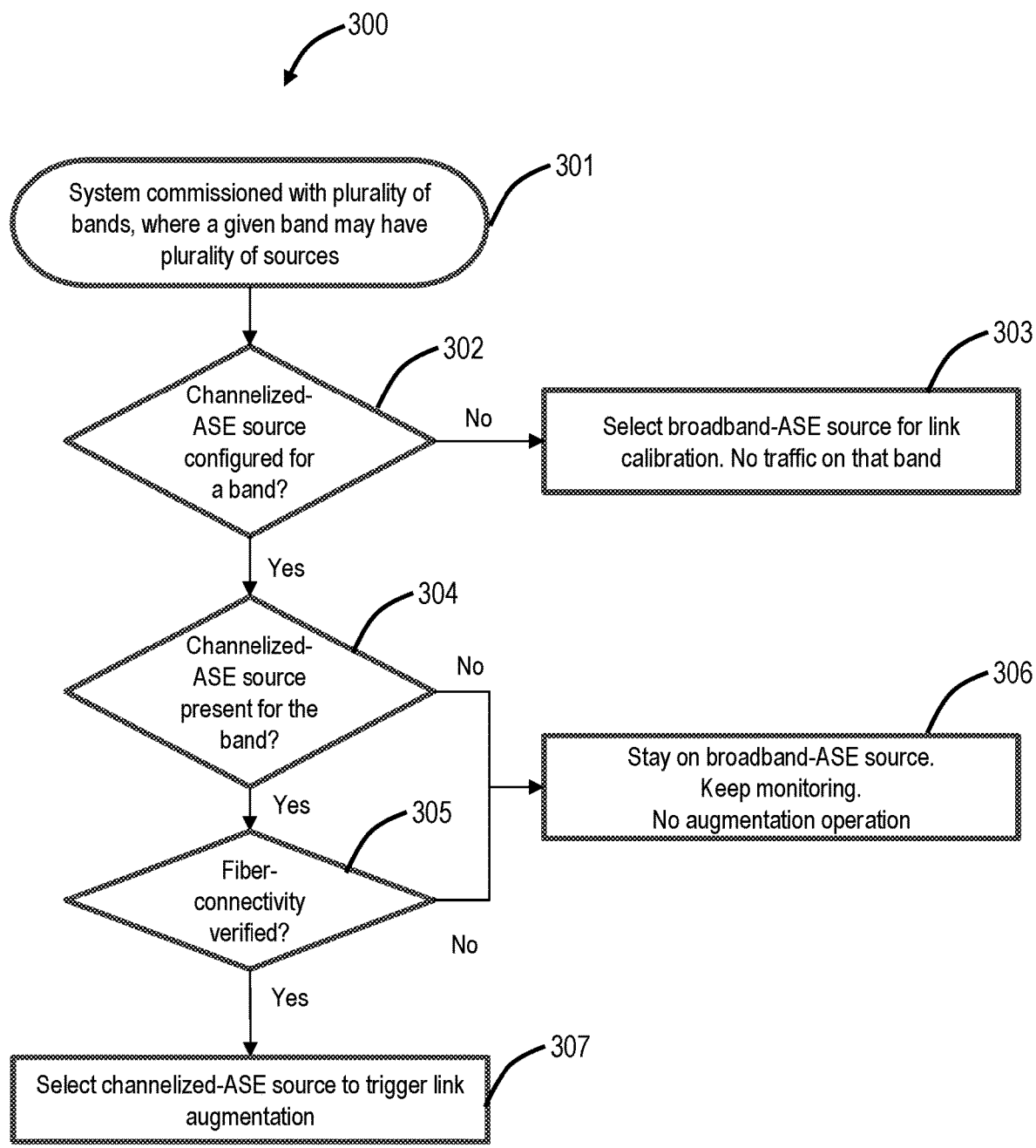
FIG. 25 is a flowchart of an optical line system configuration process.

FIG. 25 is a flowchart of an optical line system configuration process 300. The process 300 begins with the system commissioned with plurality of bands, where a given band may have a plurality of sources (step 301). If there is not a Channelized-ASE source configured for a band (step 302), then select broadband-ASE source for link calibration and there is no traffic on that band (step 303). If there is a Channelized-ASE source configured for a band (step 302), then if there is not a Channelized-ASE source present for the band (step 304) and there is no fiber connectivity verified (step 305), the remain with a broadband-ASE source, continue monitoring, and no augmentation operation is needed for the band (step 306); otherwise, select the Channelized-ASE source to trigger link band augmentation (step 307).

Figure 26:
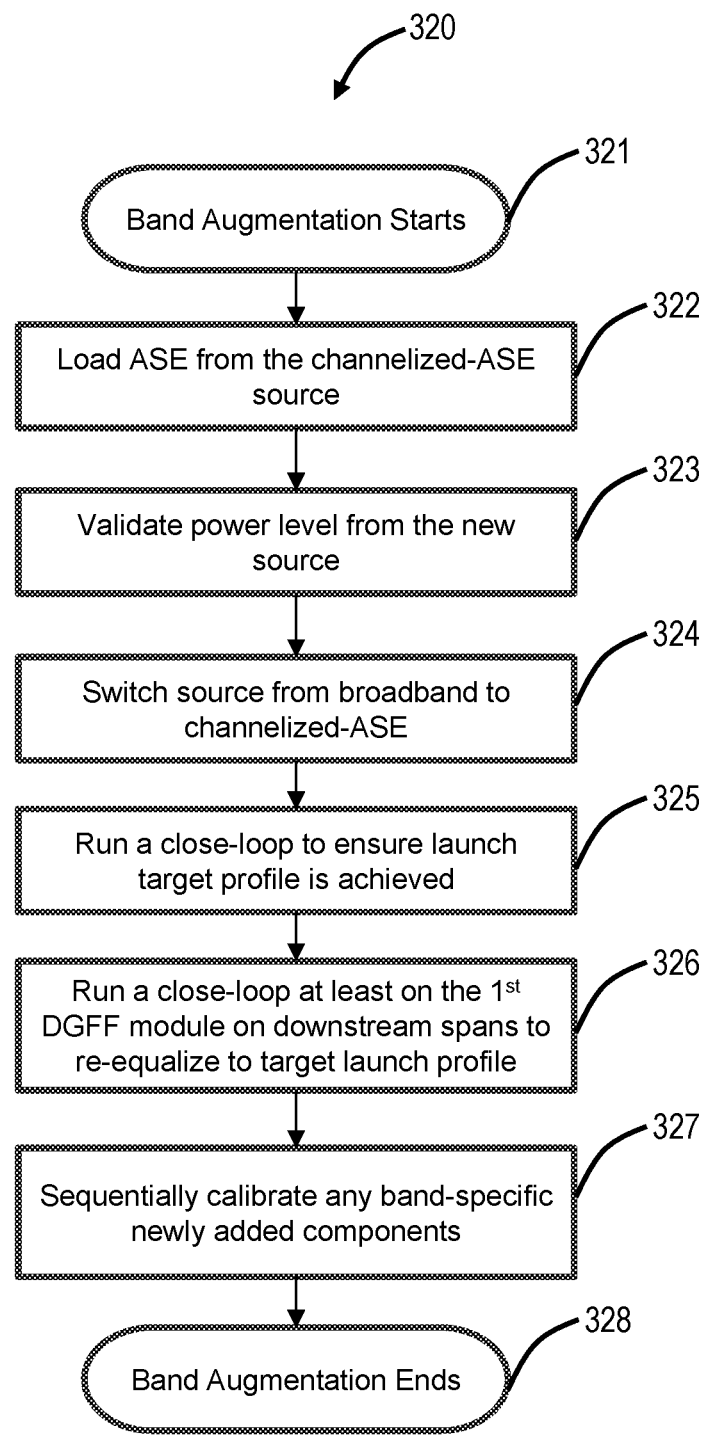
FIG. 26 is a flowchart of a band augmentation process.

FIG. 26 is a flowchart of a band augmentation process 320. The band augmentation process starts (step 321), loads ASE from the channelized-ASE source (step 322), validates power level from the new source (step 323), switches source from broadband to channelized-ASE (step 324), runs a close-loop to ensure launch target profile is achieved (step 325), runs a close-loop at least on the 1st DGFF module on downstream spans to re-equalize to target launch profile (step 326), sequentially calibrates any band-specific newly added components (step 327), and the band Augmentation Ends (step 328).

Figure 27:
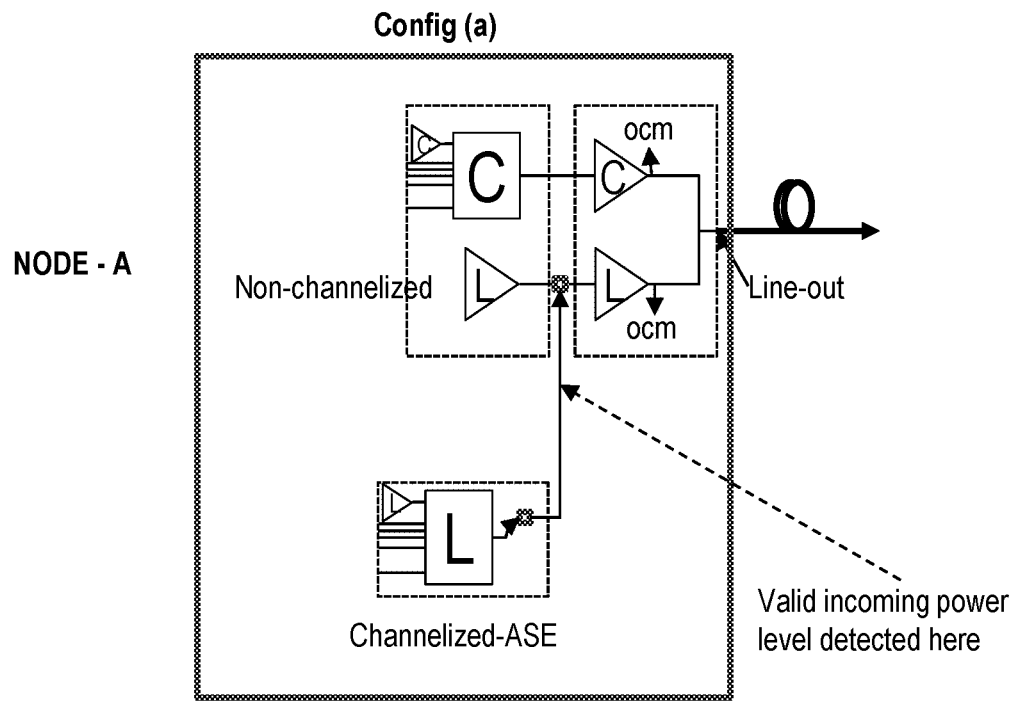
FIG. 27 is a block diagram of example multiplexer configurations for brownfield band augmentation.
Figure 27:
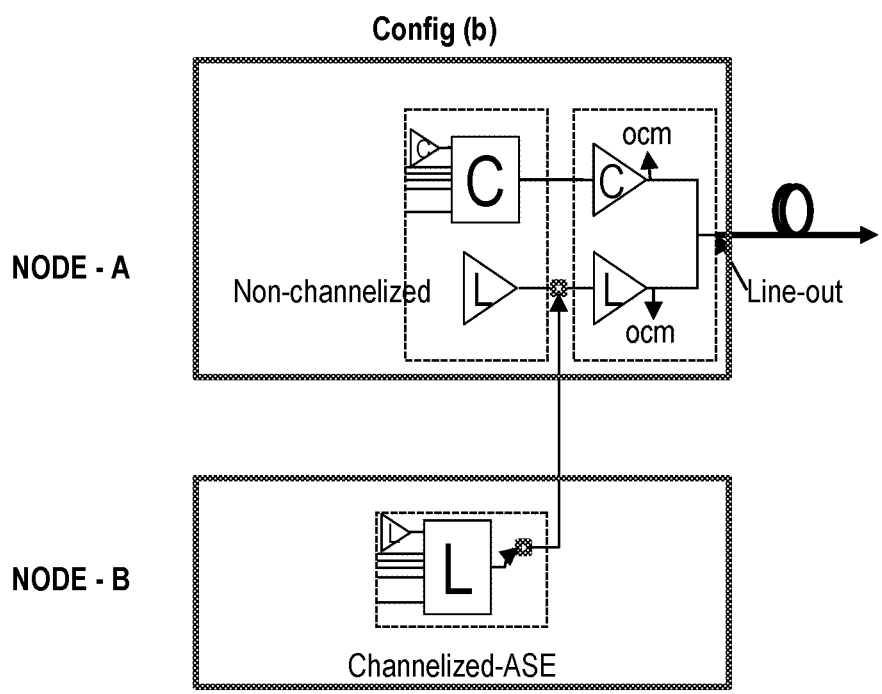
Figure 28:
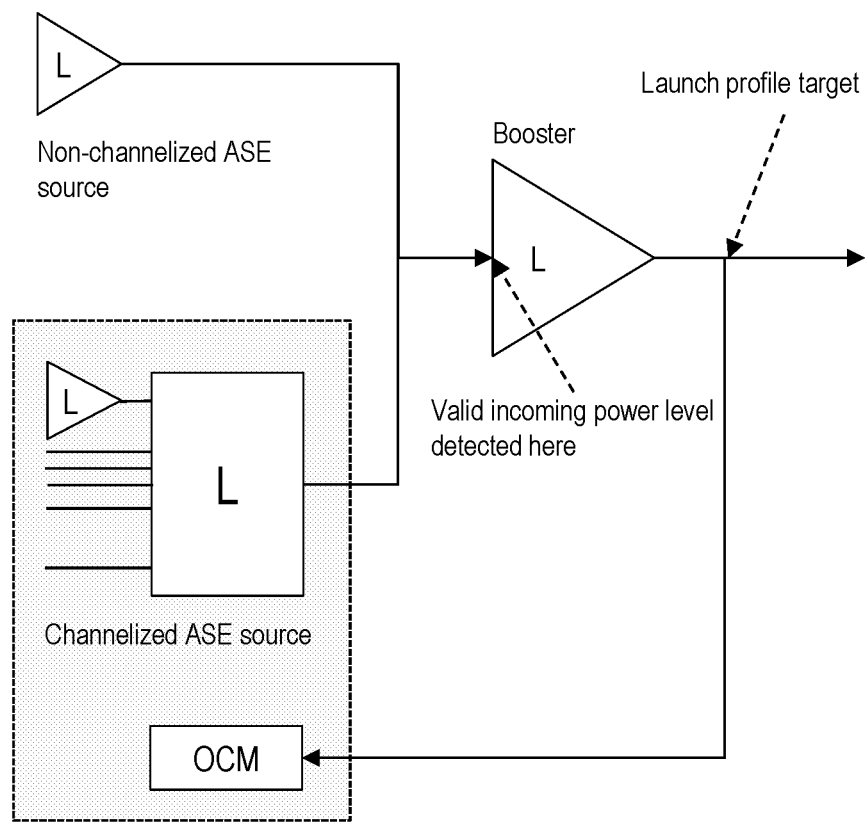
FIGS. 28-31 are diagrams illustrating an example of the band augmentation process.

FIG. 27 is a block diagram of example multiplexer configurations for brownfield band augmentation. FIGS. 28-31 are diagrams illustrating an example of the band augmentation process 320. FIG. 28 illustrates connection validation and switching at the mux. For valid power detection, more specifically, the controller takes a snapshot of the current power level coming to the input of the booster, where source is solely from non-channelized ASE, and sets that as a target power level for the channelized-ASE source, puts the booster into a gain-clamp mode, where amp gain control loop maintains a total output power and a flat gain by reducing the gain automatically for a rise in input power, brings the channelized-ASE source out of shutoff, and ramps the output power level to a target (this may put the booster amp into clamped state), confirms the fiber connectivity between the channelized-ASE and the booster, and then turns off the non-channelized-ASE source (this brings amp out of clamped state) and runs an extra close loop control cycle to ensure launch profile target is met where ASE is now solely originated from the channelized-ASE source (this also ensures the new OCM connectivity).

With this process, at the worst case, the line-facing booster sees double amount of power at the input (at a slew rate of seconds) and maintains flat gain (typically at a fast transient control in 10's ms) to match the target output power limit. With that, the other spectrum-band does not really see much of a transient impact while switching the source.

Figure 29:
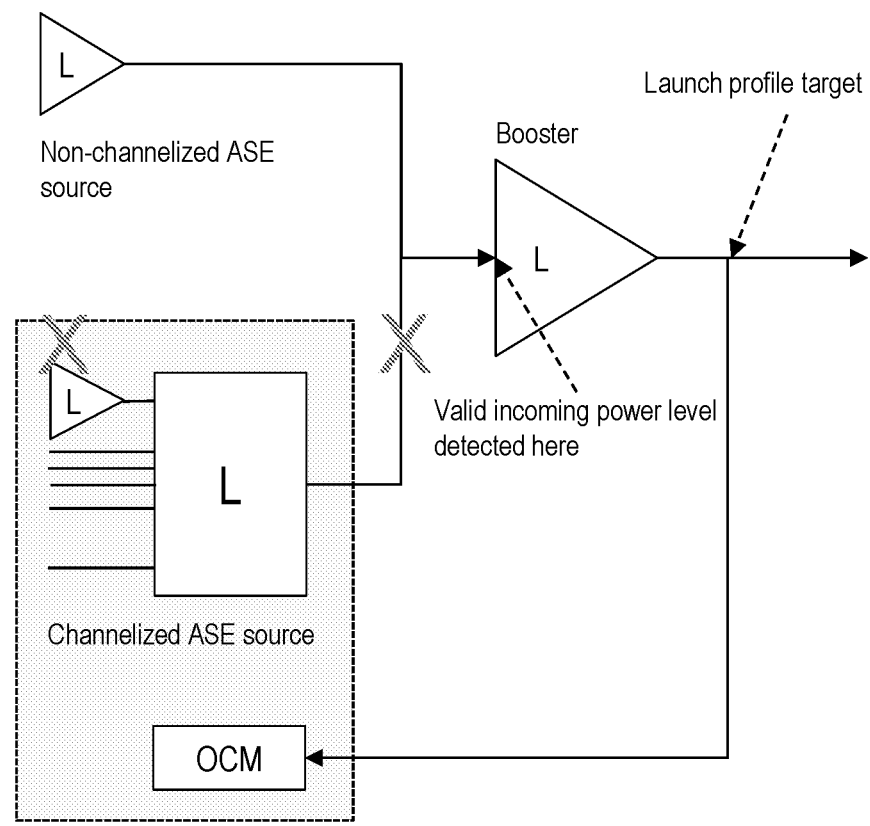

FIG. 29 illustrates normalization with fiber events. If at any given time, the channelized ASE source is lost (CP failure, fiber cut before hitting the line-fiber), then the local controller automatically switches back to the broadband ASE source until the associated fault is cleared. At the event of fiber re-connect, controller follows the same step (FIG. 28) as followed for initial validation and switch (normalized behavior).

Figure 30:
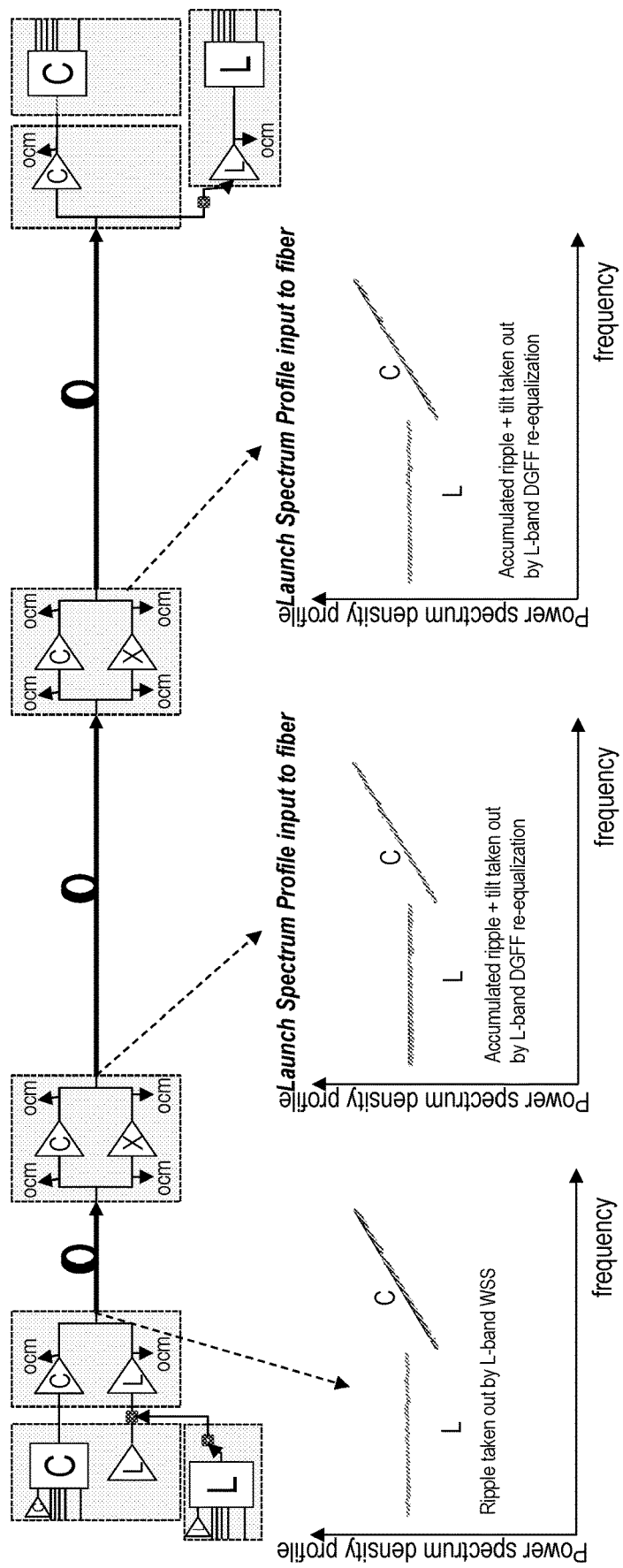

FIG. 30 illustrates ripple elimination. Once the new channelized source is augmented at section-mux, the local controller runs a specific band-equalization function at least on the 1st DGFF after the mux to take out any newly accumulated ripples and tilt over the preceding spans. The function to check measured launch power profile for the newly augmented band meeting the previously calibrated target is explicitly done span by span sequentially, while the other band remains in-service carrying traffic.

Figure 31:
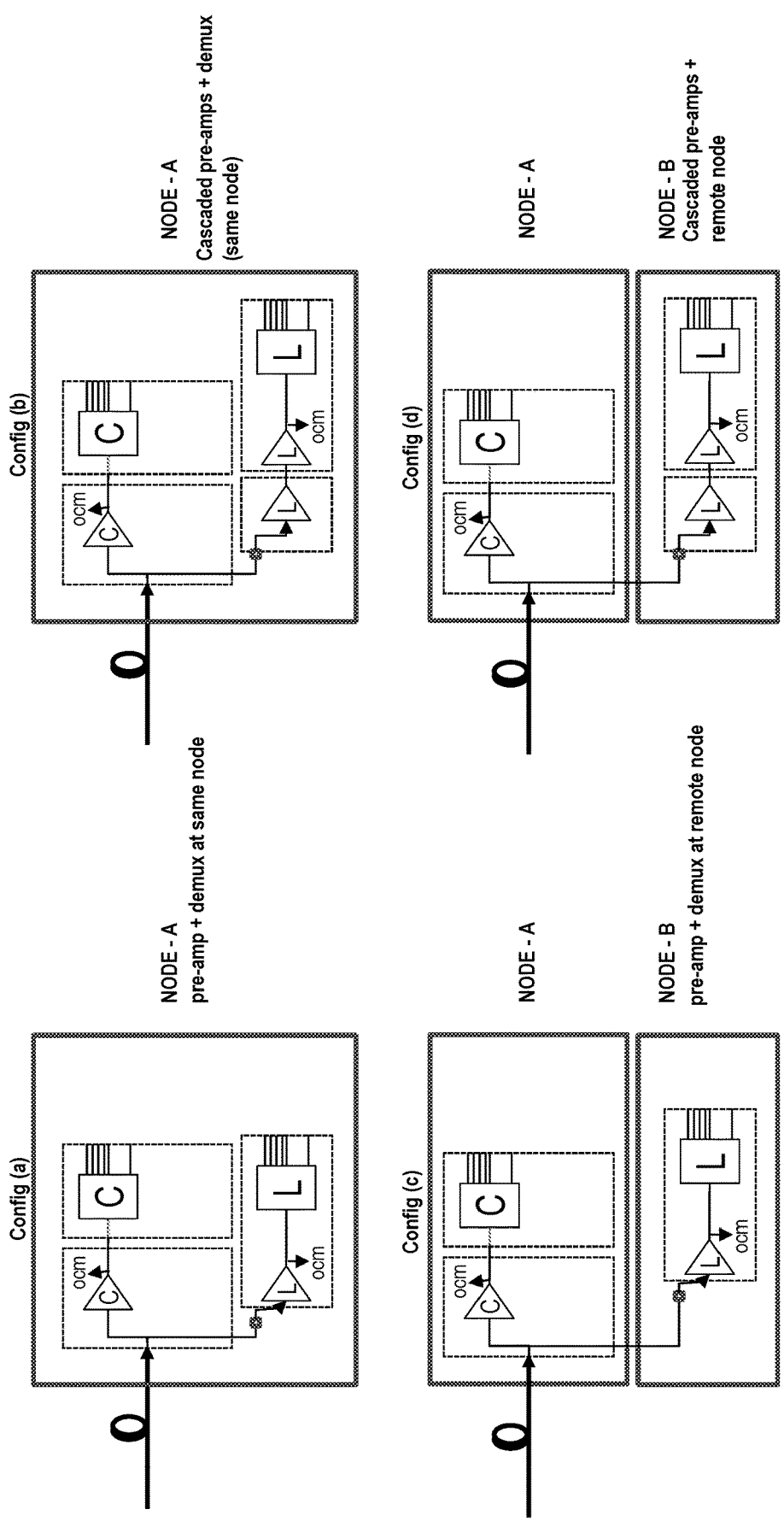

FIG. 31 illustrates calibrating new band components. As part of the band augmentation process, the orchestrator detects the presence of one or more pre-amplifiers and a section-demux WSS and calibrates them to their given target. Such calibration task includes: Checking fiber connectivity of the newly inserted band-specific components; Setting target gain, gain-tilt for amplifiers; Optimizing gain-settings if plurality of amplifiers are present; Taking calibrated baseline profiles for receiving spectrum at line-in and amp-out locations; Taking per-band transmission loss profile for preceding fiber span for newly augmented band; and Deriving target power profiles at demux switch out locations. If newly introduced band-components are located in a different node or shelf, then the local controller spawn remote child-controller instances to complete the above calibration functions.

The automated process for band-augmentation/swapping is implemented in an already in-service system without creating any significant link budget impact on other bands. As soon as user is plugging the new L-band source (channelized) and finishing the fibering, the method is automatically adapting to the new source without further user intervention. On eliminating ripples and other calibration issues automatically and abstracting the complexities from users on avoiding manual and sequential step by step procedures. On normalizing automated process on band-swap vs fiber-fault events and recovery process. On normalizing the process for local vs remote node location for the new channelized-ASE source and abstracting the complexities.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical node comprising:
an Optical Add-Drop Multiplexer (OADM) multiplexer including a channel holder source configured to emulate full-fill channel conditions on the fiber span for calibration thereof;
an optical amplifier connected to the OADM multiplexer and to a fiber span;
an Optical Channel Monitor (OCM) configured to monitor optical spectrum before and after the optical amplifier; and
a controller configured to
obtain data associated with the fiber span including measurements from the OCM,
determine settings of the channel holder source needed to meet a target launch power profile for the fiber span, and
configure the channel holder source based on the determined settings.

2. The optical node of claim 1, wherein the controller is further configured to
calibrate settings of the OADM multiplexer and the optical amplifier.

3. The optical node of claim 2, further comprising
a Raman amplifier, and wherein the controller is also configured to calibrate settings of the Raman amplifier, with the channel holder source configured to emulate full-fill channel conditions on the fiber span.

4. The optical node of claim 1, wherein the OADM multiplexer is configured to block adjacent fiber spans thereby containing the calibration to the fiber span.

5. The optical node of claim 1, wherein, prior to the calibration, the data includes any of Optical Time Domain Reflectometer (OTDR) measurements, Raman amplifier gain measurements, and fiber measurements.

6. The optical node of claim 1, wherein the calibration is performed automatically.

7. The optical node of claim 1, wherein the calibration is performed subsequent to communications being established between the optical node and an adjacent node and subsequent to one or more measurements on the fiber span.

8. The optical node of claim 1, further comprising
an Optical Time Domain Reflectometer (OTDR) configured to measure the fiber span for some of the data.

9. The optical node of claim 1, wherein the target launch power profile is based on a fiber type in the fiber span and measured loss in the fiber span.

10. An optical node comprising:
an Optical Add-Drop Multiplexer (OADM) multiplexer including a channel holder source;
an optical amplifier connected to the OADM multiplexer and to a fiber span;
an Optical Channel Monitor (OCM) configured to monitor optical spectrum before and after the optical amplifier;
a controller configured to
obtain data associated with the fiber span including measurements from the OCM,
determine settings of the channel holder source needed to meet a target launch power profile for the fiber span, and
configure the channel holder source based on the determined settings; and
an Optical Time Domain Reflectometer (OTDR) configured to measure the fiber span for some of the data.

11. The optical node of claim 10, wherein the controller is further configured to calibrate settings of the OADM multiplexer and the optical amplifier, with the channel holder source configured to emulate full-fill channel conditions on the fiber span.

12. The optical node of claim 11 NB further comprising a Raman amplifier, and wherein the controller is also configured to calibrate settings of the Raman amplifier, with the channel holder source configured to emulate full-fill channel conditions on the fiber span.

13. The optical node of claim 10, wherein the channel holder source is configured to emulate full-fill channel conditions on the fiber span for calibration thereof.

14. The optical node of claim 10, wherein the target launch power profile is based on a fiber type in the fiber soan and measured loss in the fiber span.

15. An optical node comprising:
an Optical Add-Drop Multiplexer (OADM) multiplexer including a channel holder source;
an optical amplifier connected to the OADM multiplexer and to a fiber span;
an Optical Channel Monitor (OCM) configured to monitor optical spectrum before and after the optical amplifier; and
a controller configured to
obtain data associated with the fiber span including measurements from the OCM,
determine settings of the channel holder source needed to meet a target launch power profile for the fiber span, wherein the target launch power profile is based on a fiber type in the fiber span and measured loss in the fiber span, and
configure the channel holder source based on the determined settings.

16. The optical node of claim 15, wherein the controller is further configured to calibrate settings of the OADM multiplexer and the optical amplifier, with the channel holder source configured to emulate full-fill channel conditions on the fiber span.

17. The optical node of claim 16, further comprising a Raman amplifier, and wherein the controller is also configured to calibrate settings of the Raman amplifier, with the channel holder source configured to emulate full-fill channel conditions on the fiber span.

18. The optical node of claim 15, wherein the channel holder source is configured to emulate full-fill channel conditions on the fiber span for calibration thereof.

19. The optical node of claim 15, further comprising an Optical Time Domain Reflectometer (OTDR) configured to measure the fiber span for some of the data.

* * * * *